US012573086B2

(12) United States Patent     (10) Patent No.:   US 12,573,086 B2

Mizohana et al.     (45) Date of Patent:    Mar. 10, 2026

(54) CONTROL METHOD, RECORDING MEDIUM, METHOD FOR MANUFACTURING PRODUCT, AND SYSTEM

(71) Applicant: CANON KABUSHIKI KAISHA, Tokyo (JP)

(72) Inventors: Hiroto Mizohana, Kanagawa (JP); Ryoji Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 18/205,065

(22) Filed: Jun. 2, 2023

(65) Prior Publication Data

US 2023/0390936 A1     Dec. 7, 2023

(30) Foreign Application Priority Data

Jun. 7, 2022   (JP) ............................. JP2022-092208
Mar. 9, 2023   (JP) ............................. JP2023-036711

(51) Int. Cl.
     *G06T 7/73*       (2017.01)

(52) U.S. Cl.
     CPC ..................................... *G06T 7/74* (2017.01)

(58) Field of Classification Search
     None
     See application file for complete search history.

(56) References Cited

U.S. PATENT DOCUMENTS 10,576,630 B1 *   3/2020   Diankov ................ B25J 9/1612
11,151,405 B1 *   10/2021   Hoffmann ............... G06F 18/23
(Continued)

FOREIGN PATENT DOCUMENTS

CN     112894815 A    6/2021
JP     2009-083094 A    4/2009
(Continued)

OTHER PUBLICATIONS

Ergene, M. C., & Durdu, A. (Sep. 2017). Robotic hand grasping of objects classified by using support vector machine and bag of visual words. In 2017 International Artificial Intelligence and Data Processing Symposium (IDAP) (pp. 1-5). IEEE. (Year: 2017).*
(Continued)

*Primary Examiner* — Ian L Lemieux

(74) *Attorney, Agent, or Firm* — Venable LLP

(57)           ABSTRACT

A control method for controlling an apparatus including a movable portion by a visual servo includes obtaining a goal image corresponding to a goal positional relationship between the movable portion and a target object, extracting goal feature points whose information has a degree of freedom of $\psi$ from the goal image by image processing, obtaining a current image corresponding to a current positional relationship between the movable portion and the target object, extracting candidate feature points from the current image by image processing, extracting current feature points associated with the goal feature points from the candidate feature points by performing matching processing between the candidate feature points and the goal feature points, and generating, by using matching information based on matching between the current feature points and the goal feature points in the matching processing, a control signal for moving the movable portion at a degree of freedom of n.

31 Claims, 20 Drawing Sheets

(56)        References Cited

U.S. PATENT DOCUMENTS

| 11,741,566 B2 * | 8/2023 | Chavez | G06T 1/20 |
| | | | 700/217 |
| 2010/0004778 A1 * | 1/2010 | Arimatsu | G06T 1/0014 |
| | | | 700/214 |
| 2012/0294509 A1 * | 11/2012 | Matsumoto | B25J 9/1697 |
| | | | 382/153 |
| 2015/0120047 A1 | 4/2015 | Motoyoshi et al. | |
| 2018/0137346 A1 | 5/2018 | Mori et al. | |
| 2019/0099890 A1 * | 4/2019 | Harada | B25J 9/1687 |
| 2019/0299405 A1 * | 10/2019 | Warashina | B25J 9/1697 |
| 2021/0162600 A1 * | 6/2021 | Clever | B25J 9/1605 |
| 2022/0206509 A1 * | 6/2022 | Guo | G05D 1/0253 |
| 2022/0297296 A1 * | 9/2022 | Kondapally | B25J 9/1612 |
| 2023/0107993 A1 * | 4/2023 | Kupcsik | B25J 9/1697 |
| | | | 700/253 |
| 2023/0234233 A1 * | 7/2023 | Goyal | G06T 7/269 |
| 2024/0262635 A1 * | 8/2024 | Okada | G06V 10/806 |

FOREIGN PATENT DOCUMENTS

| JP | 2012-254518 A | 12/2012 |
| JP | 2014-140941 A | 8/2014 |
| JP | 2014-140942 A | 8/2014 |
| JP | 2015-085491 A | 5/2015 |
| JP | 2020-015101 A | 1/2020 |
| JP | 2020-015102 A | 1/2020 |
| JP | 2021-109291 A | 8/2021 |

OTHER PUBLICATIONS

Tran, T. T. H., & Marchand, E. (Apr. 2007). Real-time keypoints matching: application to visual servoing. In Proceedings 2007 IEEE International Conference on Robotics and Automation (pp. 3787-3792). IEEE. (Year: 2007).*

Ghasemi, A., Li, P., Xie, W. F., & Tian, W. (2019). Enhanced switch image-based visual servoing dealing with featuresloss. Electronics, 8(8), 903. (Year: 2019).*

Kouskouridas, R., Amanatiadis, A., & Gasteratos, A. (Jul. 2012). Pose manifolds for efficient visual servoing. In 2012 IEEE International Conference on Imaging Systems and Techniques Proceedings (pp. 470-475). IEEE. (Year: 2012).*

Intisar, M., Khan, M. M., Islam, M. R., & Masud, M. (2021). Computer Vision Based Robotic Arm Controlled Using Interactive GUI. Intelligent Automation & Soft Computing, 27(2). (Year: 2021).*

Sivčev, S., Rossi, M., Coleman, J., Dooly, G., Omerdić, E., & Toal, D. (2018). Fully automatic visual servoing control for work-class marine intervention ROVs. Control Engineering Practice, 74, 153-167. (Year: 2018).*

Xu, D., Lu, J., Wang, P., Zhang, Z., & Liang, Z. (2017). Partially decoupled image-based visual servoing using different sensitive features. IEEE Transactions on Systems, Man, and Cybernetics: Systems, 47(8), 2233-2243. (Year: 2017).*

Nov. 30, 2023 Extended Search Report in European Patent Application No. 23 17 6604.

Nicholas Adrian et al., "DFBVS: Deep Featured-Base Visual Servo", dated Jan. 20, 2022.

Anwar Ali et al., "Quality Inspection of Remote Radio Unit (RRU) Power Port Using IBVS", dated May 13, 2018.

Nicholas Adrian et al., DFBVS: Deep Feature-Based Visual Servo, ARXIV.org, IEEE 18th International Conference on Automation Science and Engineering, 1783-89 (Aug. 20, 2022).

Xin Jing et al., Robot Visual Sliding Mode Servoing Using SIFT features, Proceedings of the 35th Chinese Control Conference, IEEE, p. 4723-29 (Jul. 27, 2016).

Dec. 12, 2024 Office Action in Japanese Patent Application No. 2023-036711.

* cited by examiner

FIG.7A
FIG.7B
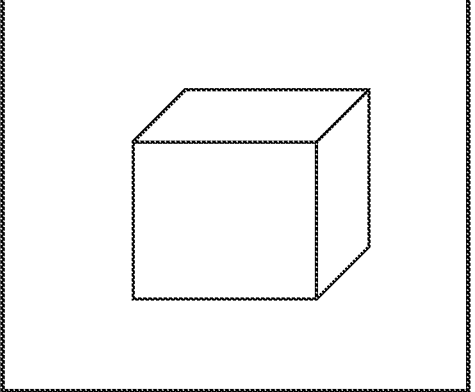
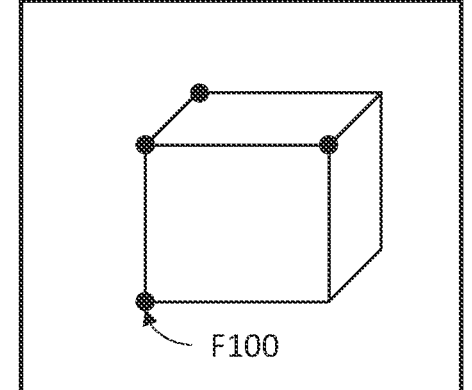
F100
FIG.7C
FIG.7D
F101
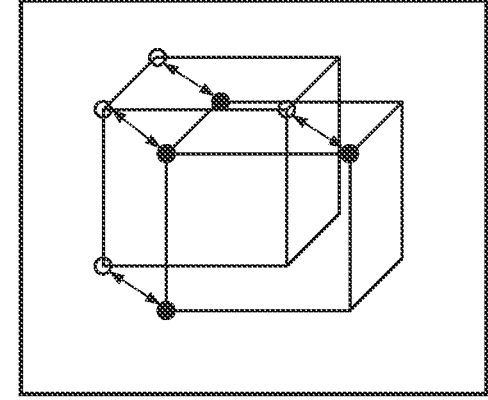

FP1

F100

F110    F120

F130    F140

F115    F125

F135    F145

V101    V102    V100

CAPTURE    REGISTER

FIG.18B    V100

CONTROL METHOD, RECORDING MEDIUM, METHOD FOR MANUFACTURING PRODUCT, AND SYSTEM

BACKGROUND OF THE INVENTION

Field of the Invention

The present invention relates to a control method for controlling the operation of an apparatus including a movable portion by a visual servo, and the like.

Description of the Related Art

In various fields such as a manufacturing site, robots have been increasingly introduced. As a method for controlling the position and posture of a robot, a visual servo that measures change in the position of a target object as visual information and uses the visual information as feedback information. Specifically, regarding the robot and/or the work target object, a goal image captured in a position and posture serving as a goal and a current image captured in a current position and posture are obtained, and the robot is controlled on the basis of the difference therebetween. This is advantageous in that strict calibration does not need to be performed in advance, and alignment can be performed on the basis of the captured images even in the case where there is a difference between the actual operation of the robot and a command value.

There are roughly two kinds of visual servo in terms of the control system thereof. One is a position-based visual servo that recognizes the current position of the target object and feeds back the difference between the goal position and the current position to the robot. The other one is an image-based visual servo that extracts an image feature included in an image of the target object in the current image and feeds back the difference thereof from an image feature in the goal image. Among these, in the image-based visual servo, the image feature deviation and a robot control amount are associated with each other by using an image Jacobian. This method is advantageous in that since recognition of the position and posture of the target object is not necessary, the computational load is small, and since a recognition error is less likely to be included in the feedback signal, the robot can be controlled with high precision.

Japanese Patent Laid-Open No. 2012-254518 discloses a technique of imaging a target object including a marker, extracting the marker in the image as an image feature, and performing visual servo control.

To perform appropriate control by the image-based visual servo, a graphical feature of the target object needs to be appropriately extracted from a current image captured in a current position and posture. However, in the current image captured in a current imaging condition, it may be difficult to extract a graphical feature of the target object. For example, in the case where an object to which applying an indicator such as a marker having an excellent detectability in an image is not allowed or an object not having a remarkable feature in an outer shape thereof is a target object, it may be difficult to extract the graphical feature. If part or all of the graphical feature of the target object is not extracted, a problem that an appropriate feedback signal for controlling the robot cannot be generated, and erroneous control is performed or the visual servo has to be stopped can occur.

Therefore, there has been a demand for a technique that enables stably obtaining information required for appropriately implementing the visual servo from a captured image.

SUMMARY OF THE INVENTION

According to a first aspect of the present invention, a control method for controlling an apparatus including a movable portion by a visual servo includes obtaining a goal image corresponding to a goal positional relationship between the movable portion and a target object, extracting goal feature points whose information has a degree of freedom of $\psi$ from the goal image by image processing, obtaining a current image corresponding to a current positional relationship between the movable portion and the target object, extracting candidate feature points from the current image by image processing, extracting current feature points associated with the goal feature points from the candidate feature points by performing matching processing between the candidate feature points and the goal feature points, and generating, by using matching information based on matching between the current feature points and the goal feature points in the matching processing, a control signal for moving the movable portion at a degree of freedom of n. The number N of the goal feature points extracted from the goal image satisfies $N \geq 2 \times L$, where L represents a minimum integer M satisfying $M > (m+1)/\psi$.

According to a second aspect of the present invention, a control method for controlling an apparatus including a movable portion by a visual servo includes obtaining a goal image corresponding to a goal positional relationship between the movable portion and a target object, extracting goal feature points whose information has a degree of freedom of $\psi$ from the goal image by image processing, classifying the goal feature points into a plurality of goal feature point clusters by first clustering processing, obtaining goal feature point cluster representative information for each of the plurality of goal feature point clusters, obtaining a current image corresponding to a current positional relationship between the movable portion and the target object, extracting candidate feature points from the current image by image processing, extracting current feature points associated with the goal feature points from the candidate feature points by performing matching processing between the candidate feature points and the goal feature points, classifying the current feature points into a plurality of current feature point clusters by second clustering processing, obtaining current feature point cluster representative information for each of the plurality of current feature point clusters, and generating, by using matching information between the current feature point cluster representative information and the goal feature point cluster representative information, a control signal for moving the movable portion at a degree of freedom of n. The number N of the goal feature points extracted from the goal image satisfies $N > (n+1)/\psi$.

According to a third aspect of the present invention, a control method for controlling an apparatus including a movable portion by a visual servo includes obtaining a goal image corresponding to a goal positional relationship between the movable portion and a target object, extracting goal feature points whose information has a degree of freedom of $\psi$ from the goal image by image processing, obtaining a current image corresponding to a current positional relationship between the movable portion and the target object, extracting candidate feature points from the current image by image processing, extracting current feature points associated with the goal feature points from the candidate feature points by performing matching processing between the candidate feature points and the goal feature points, correcting the current feature points by using the current feature points obtained by the matching processing and a priority order set for the goal feature points, and generating, by using matching information based on matching between the corrected current feature points and the goal feature points, a control signal for moving the movable portion at a degree of freedom of n. The number N of the goal feature points extracted from the goal image satisfies $N>(n+1)/\psi$.

Further features of the present invention will become apparent from the following description of exemplary embodiments with reference to the attached drawings.

BRIEF DESCRIPTION OF THE DRAWINGS

FIG. 7A illustrates an example of a goal image related to conventional visual servo control.

FIG. 7B illustrates an example of goal feature points used in the conventional visual servo control.

FIG. 7C illustrates an example of current feature points extracted in the conventional visual servo control.

FIG. 7D is a diagram for describing the correspondence relationship between the current feature points and the goal feature points in the conventional visual servo control.

FIG. 18B illustrates an example of a display screen in the case of displaying a matching result on an output device.

DESCRIPTION OF THE EMBODIMENTS

Figure 1:
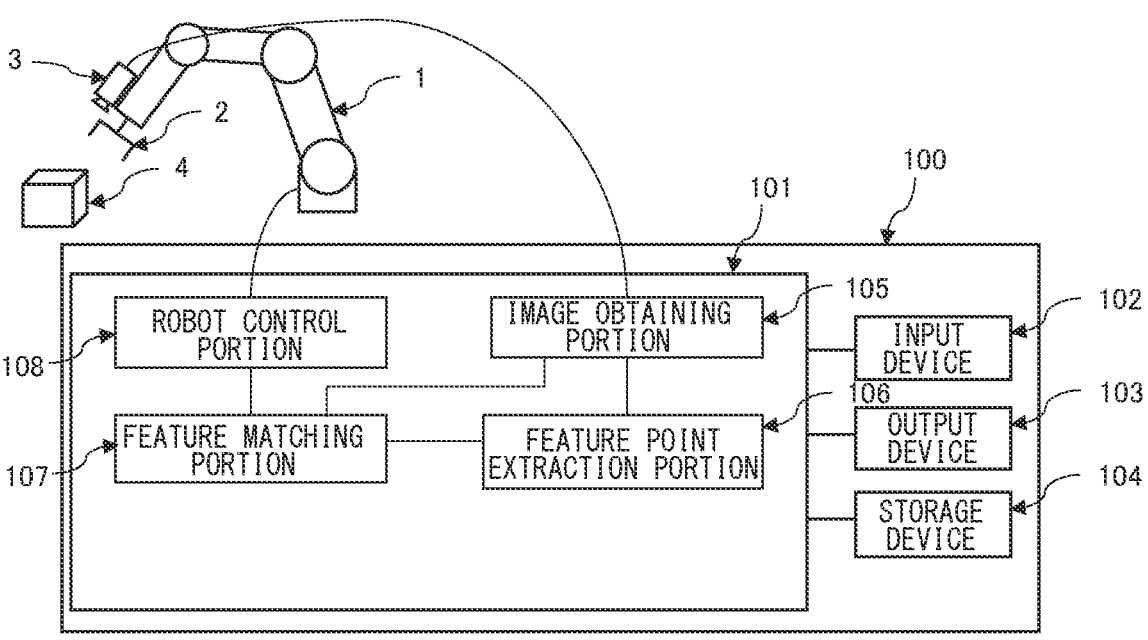
FIG. 1 is a schematic view of a robot system according to a first embodiment illustrating a schematic configuration thereof.

Control methods, systems, and the like serving as embodiments of the present invention will be described with reference to drawings. The embodiments described below are merely examples, and for example, details of the configurations thereof can be appropriately modified for implementation by one skilled in the art within the gist of the present invention.

To be noted, in the drawings referred to in the following description of embodiments, it is assumed that elements denoted by the same reference signs have substantially the same functions unless otherwise described. In addition, the drawings may be schematically expressed for the sake of convenience of illustration and description, and therefore do not necessarily strictly match actual shapes, sizes, layouts, and the like.

First Embodiment

System

FIG. 1 is a schematic view of a robot system serving as a system according to a first embodiment illustrating a schematic configuration thereof. The robot system includes a robot 1 serving as an apparatus including a movable portion, and a controller 100 serving as a control portion.

The robot 1 is, for example, a multi-axis controllable articulated robot, but the robot 1 may be a robot of a different type. In addition, the apparatus including a movable portion may be an apparatus other than a robot, and may be, for example, an apparatus including a movable portion capable of performing expansion/contraction, bending, vertical movement, horizontal movement, turning, or a composite operation of these. The movable portion is a portion capable of moving with respect to a reference, where movement means displacement and displacement means change in the position. Therefore, the movable portion is a portion capable of changing the position thereof with respect to a reference. Here, the reference may be a part of the apparatus including the movable portion, may be something different from the apparatus including the movable portion, or may be the earth. The entirety of the apparatus including the movable portion may be movable with respect to the reference, and the apparatus including the movable portion may be a moving body. Examples of the moving body include vehicles such as automobiles, ships, and aircrafts such as drones.

The robot 1 serving as an example includes an end effector 2 and an image pickup apparatus 3, and is mutually communicably connected to the controller 100 in a wireless or wired manner. For example, the robot 1 can perform a work such as inspecting a workpiece 4 by using the image pickup apparatus 3 or moving or positioning the workpiece 4 by using the end effector 2. Alternatively, the robot 1 can perform various works such as works related to manufacture of products. Examples of the works related to manufacture of products include gripping the workpiece 4 and coupling the workpiece 4 to another workpiece, and processing the workpiece 4 by operating a tool by using the end effector 2.

The controller 100 serving as a control portion is an apparatus that controls the operation of the robot 1, and is constituted by hardware such as a control apparatus 101, an input device 102, an output device 103, and a storage device 104.

The control apparatus 101 is capable of communicating a signal with a motor, a sensor, an encoder, and the like included in the robot 1, and the image pickup apparatus 3 via an input/output port: I/O port that the control apparatus 101 includes. The control apparatus 101 is, as hardware, a computer constituted by a central processing unit: CPU, various storage devices such as a random access memory: RAM, a read-only memory: ROM, a hard disk drive: HDD, and a solid state device: SSD, an I/O port, and a dedicated circuit such as application specific integrated circuit: ASIC. A hardware configuration including a graphic processing unit: GPU and a GPU memory (video RAM: VRAM) suitable for high-speed processing may be provided. In addition, the control apparatus 101 may be constituted by connecting a plurality of computers via a network.

In FIG. 1, functions that the control apparatus 101 include are schematically illustrated as functional blocks instead of illustrating a hardware configuration of the control apparatus 101. To be noted, functional elements necessary for describing the characteristics of the present embodiment are illustrated as functional blocks in FIG. 1, and illustration of general functional elements that are not directly related to the principle of solution to problem of the present invention is omitted. In addition, the functional elements illustrated in FIG. 1 are conceptual, and do not need to be physically configured as illustrated. For example, the specific modes of the separation and integration of the functional blocks are not limited to the illustrated example, and all or some of these may be functionally or physically separated or integrated as arbitrary; units in accordance with the use status and the like.

The control apparatus 101 includes an image obtaining portion 105, a feature point extraction portion 106, a feature matching portion 107, and a robot control portion 108 that are functional blocks. These functional blocks are realized by the CPU or the GPU loading and executing a program stored in a computer-readable recording medium. Examples of the computer-readable recording medium include the ROM, the storage device 104, and an unillustrated external storage device. In addition, examples of the computer-readable recording medium include hard disks, flexible disks, optical disks, magneto-photo disks, magnetic tapes, nonvolatile memories such as universal serial bus memories: USB memories, and devices such as SSDs. To be noted, part of the functional blocks may be realized by dedicated hardware such as an ASIC.

Although the function of each portion will be described in detail later, the image obtaining portion 105 has a function of causing the image pickup apparatus 3 to capture images such as a goal image and a current image and obtaining the images. The feature point extraction portion 106 has a function of extracting feature portions from the captured images. The feature matching portion 107 has a function of performing matching processing between current feature points and goal feature points and generating matching information. The robot control portion 108 has a function of generating a control signal of the robot 1 from the matching information generated by the feature matching portion 107 and controlling the operation of the robot 1.

The input device 102 that the controller 100 includes is a device for the user to operate to input instructions and information to the control apparatus 101. Examples of the input device 102 include a mouse, a keyboard, a touch panel, a jog dial, a pointing device, a dedicated console, and a sound inputter serving as user interfaces. In addition, the input device 102 may include a device for inputting information from an unillustrated external device to the control apparatus 101, and a network adaptor for receiving information from an external network or the like can be used as the input device 102.

The output device 103 is a display apparatus that displays information obtained by the control apparatus 101 and a user interface image: UI image for the user to input information to the control apparatus 101. For example, a liquid crystal display or an organic electroluminescence display serving as a user interface can be used as the output device 103. In addition, the output device 103 may include a device for outputting information to an unillustrated external apparatus, and a network adaptor for transmitting information to a computer or a storage device on an external network can be used.

The storage device 104 is a device that stores and loads various setting information that the controller 100 refers to when performing visual servo control, a goal image, and a control log of the robot. Examples of the setting information include settings of the image pickup apparatus, feature point extraction parameters, and a robot control program. For example, the storage device 104 can be constituted by, a device such as an HDD, an SSD, a flash memory, a network storage, or the like.

To be noted, FIG. 1 merely illustrates an example of the configuration of a robot system. Although the image pickup apparatus 3 is fixed to a link of the robot 1 in this example, the image pickup apparatus 3 may be provided separately from the robot 1. The image pickup apparatus 3 may be movable in an interlocked manner with the movement of the movable portion of the robot 1, or may be movable independently from the movement of the movable portion of the robot 1. In the case where the image pickup apparatus 3 is movable in an interlocked manner with the movement of the movable portion of the robot 1, the positional relationship between the movable portion and a target object imaged by the image pickup apparatus 3 can be derived from the positional relationship between the image pickup apparatus 3 and the target object by knowing the positional relationship between the image pickup apparatus 3 and the movable portion in advance. In the case Where the image pickup apparatus 3 is provided separately from the robot 1, the image pickup apparatus 3 is disposed in such a position and posture that the robot 1 and the workpiece 4 can be imaged, that is, disposed such that the robot 1 and the workpiece 4 are within the field angle of the image pickup apparatus 3.

Visual Servo Control

Visual servo control according to the present embodiment will be described. In the following example, a case where the end effector 2 and the image pickup apparatus 3 are disposed on the link that is on the most distal end side of the robot 1 that is a six-axis articulated robot arm and the robot 1 performs a predetermined operation under visual servo control is assumed. For example, it is assumed that the robot 1 performs a work of gripping the workpiece 4 by the end effector 2 and conveying the workpiece 4 to a predetermined position (for example, an unillustrated tray). The robot 1 performs a series of works including approaching the workpiece 4 to grip the workpiece 4, gripping the workpiece 4, and conveying the gripped workpiece 4 to the tray.

All the operation control of the robot 1 from the start to end of this series of works may be performed under visual servo control, or only part of the series of works may be performed under visual servo control. For example, in the latter case, the visual servo control may be used for an operation for which the positional relationship between the robot 1 and the workpiece 4 needs to be controlled with high precision, and for an operation for which control with a relatively low precision is allowed, for example, position control by teaching may be used. The visual servo control can be preferably applied to an operation for which the positional relationship between the robot and the work target object needs to be controlled with high precision, such as an operation of gripping a specific portion of a workpiece by an end effector or an operation of placing the gripped workpiece at a predetermined position on the tray. Meanwhile, in the case of performing an operation of moving the robot 1 from a home position to the vicinity of the workpiece 4 or the like as a preliminary stage for the gripping operation, using the position control based on normal teaching to prioritize the operation speed can be also considered.

For the sake of convenience of description, in the operation performed under the visual servo control, positions and postures appropriately set among a series of positions and postures that the robot 1 takes from the start to completion of the operation will be referred to as a goal position 1, goal position 2 . . . The robot 1 sequentially takes positions and postures of the goal position 1, goal position 2 . . . while executing the operation.

The position and posture of the robot 1 at each goal position are set such that the image pickup apparatus 3 fixed to the link of the robot 1 can image the target object whose positional relationship with the robot 1 should be evaluated for the visual servo. For example, the goal position of the robot 1 set for the operation of approaching the workpiece 4 to grip the workpiece 4 is set to such a position and posture that the image pickup apparatus 3 can image the workpiece 4 as a target object. In addition, for example, the goal position of the robot 1 set for the, operation of conveying the gripped workpiece 4 to the tray is set to such a position and posture that the image pickup apparatus 3 can image the tray as a target object. As a result of this, a goal image corresponding to the positional relationship between the robot serving as a movable portion and the workpiece (or the tray) serving as a target object can be captured. The goal image can include information related to the positional relationship between the robot serving as a movable portion and the workpiece (or the tray) serving as a target object.

To be noted, in the case where the image pickup apparatus 3 is provided separately from the robot 1 instead of being attached to the robot 1, the image pickup apparatus 3 is disposed so as to be capable of capturing a goal image corresponding to the positional relationship between the robot serving as a movable portion and the workpiece (or the tray) serving as a target object. That is, the positional relationship between the image pickup apparatus 3 and the goal position of the robot 1 is set such that at least the workpiece (or the tray) and part of the robot 1 (for example, the end effector 2) are within the field angle of the image pickup apparatus 3 when the robot 1 is at the goal position.

Figure 2:
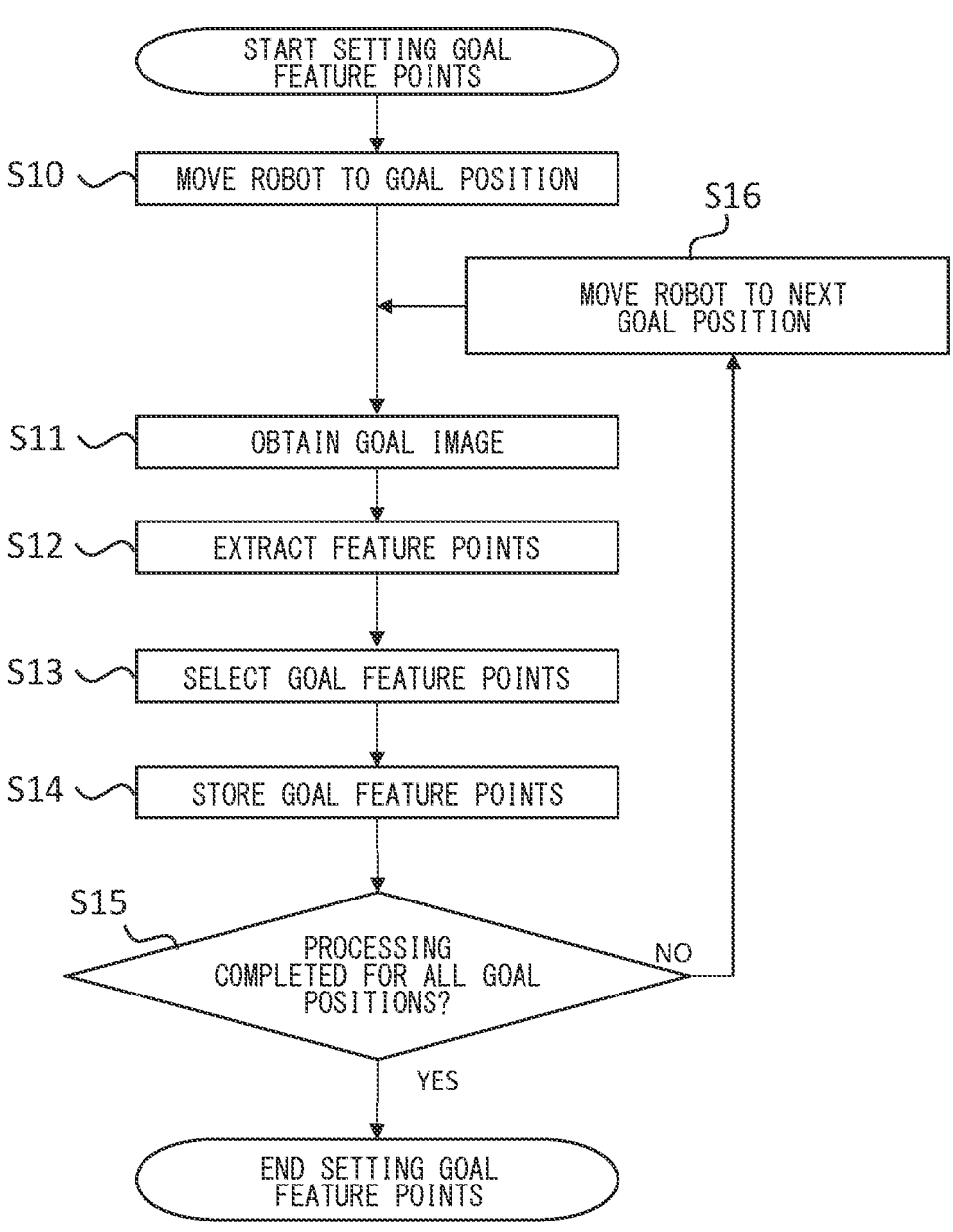
FIG. 2 is a flowchart illustrating a flow of processing of setting goal feature points in the first embodiment.
Figure 3:
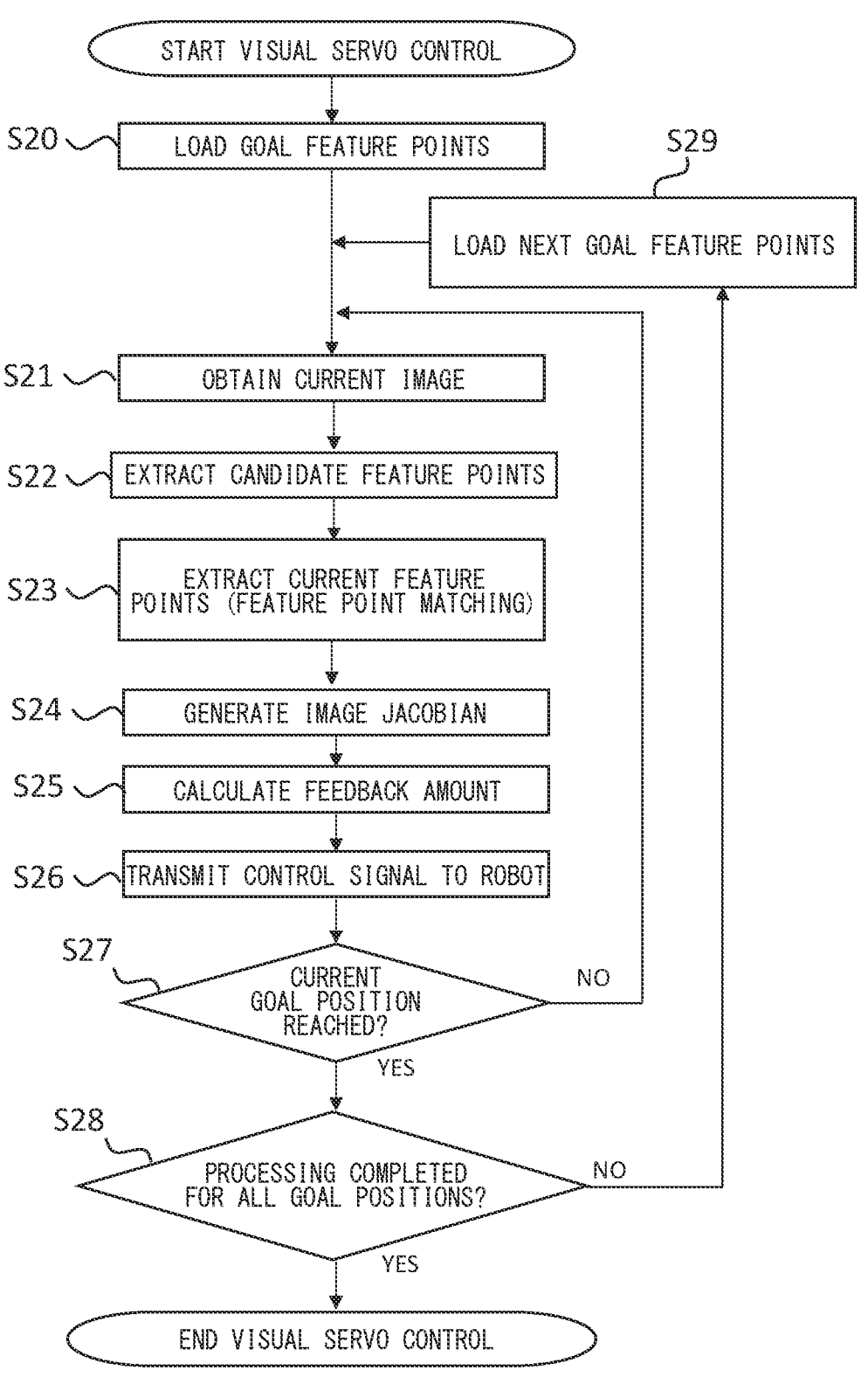
FIG. 3 is a flowchart illustrating a flow of processing of controlling the operation of a robot by visual servo control using information of the goal feature points in the first embodiment.

FIG. 2 is a flowchart illustrating a flow of processing of, as preparation for the visual servo control, moving the robot 1 to a goal position and causing the image pickup apparatus 3 to perform imaging in advance, and then setting goal feature points on the basis of the obtained goal image. In addition, FIG. 3 is a flowchart illustrating a flow of processing of controlling the operation of the robot 1 by visual servo control using the information of the set goal feature points. This will be sequentially described below Setting Processing of Goal Feature Points As preparation for the visual servo control, in step S10 of FIG. 2, the robot 1 is moved to a first goal position (for example, the goal position 1). For example, a teaching pendant can be connected to the control apparatus 101 as the input device 102, and the user can move the robot 1 to the first goal position by operating the teaching pendant. Alternatively, by so-called direct teaching, the user may manually operate the robot 1 by hand to move the robot 1 to the first goal position. The goal position needs to be set to such a position and posture that the image pickup apparatus 3 fixed to the link of the robot 1 can image the target object (for example, the workpiece 4). Therefore, in step S10, it is preferable that an image captured by the image pickup apparatus 3 is displayed on a display screen of the output device 103 such that the user can perform the operation while checking the captured image.

Next, in step S11, imaging is performed in a state in which the robot 1 is positioned in the goal position, and thus an image is obtained. The image captured in the goal position will be referred to as a "goal image". Specifically, the image obtaining portion 105 drives the image pickup apparatus 3 to perform imaging, and thus obtains the goal image. Goal images captured by the image pickup apparatus 3 are associated with information of the goal positions (goal position 1, goal position 2 . . . ) where the imaging is performed by the image pickup apparatus 3, and will be treated as, for example, a goal image 1, goal image 2 . . .

Figure 4A:
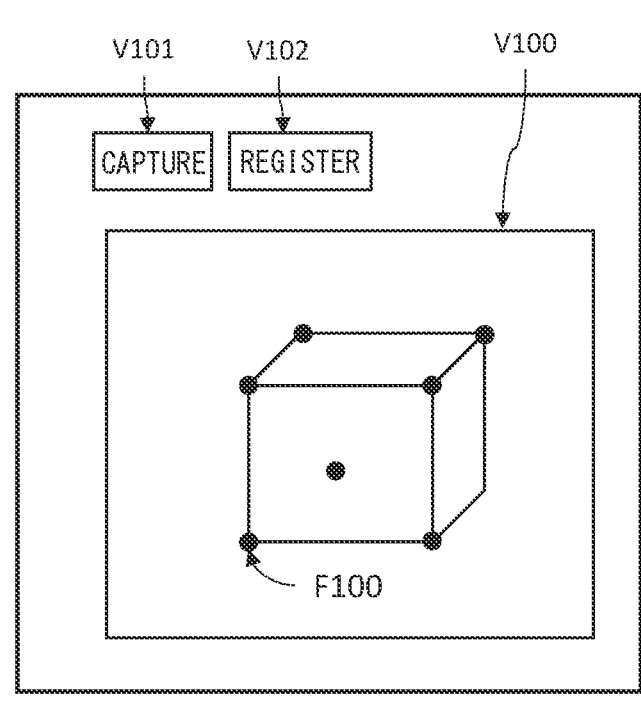
FIG. 4A is a diagram illustrating an example of a user interface screen that can be used in the first embodiment.
Figure 5A:
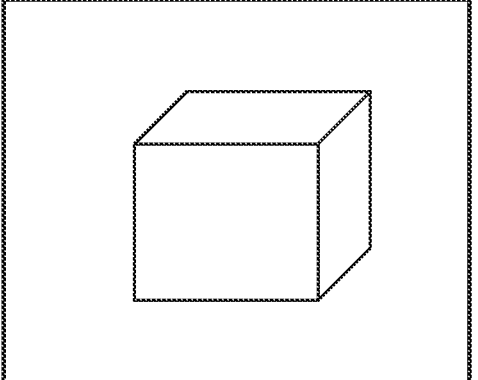
FIG. 5A illustrates an example of a goal image obtained in the first embodiment.

The control apparatus 101 is capable of displaying the captured goal image on the display screen of the output device 103 such that the user can check the captured goal image. FIG. 4A illustrates an example of a user interface screen, and an image data display portion V100, an image pickup button V101, and a registration button V102 can be displayed on the display screen. The user can input an instruction to the image pickup button V101 and the registration button V102 serving as instruction input portions via the input device 102. FIG. 5A illustrates an example of an obtained goal image. In the case where the user sees the displayed image and determines that there is a problem, for example, in the case where external light is suddenly radiated and thus the captured image is overexposed, the user can operate the image pickup button V101 to cause imaging to be executed again. The goal image can be registered in the storage device 104 in association with information of the goal position. To register information such as the goal image in a storage portion, the user may operate the registration button V102 by using the input device 102, or the control program may be configured such that the controller 100 automatically registers the information in the storage device 104.

Figure 5B:
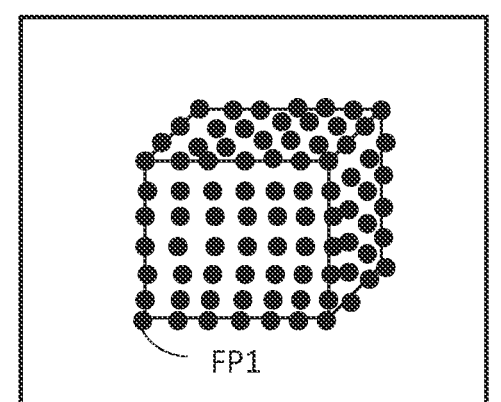
FIG. 5B illustrates an example in which feature points extracted from the goal image in the first embodiment are superimposed on the goal image.

Next, in step S12, the goal image obtained in step S11 is subjected to image processing, and feature points that are coordinate information on the image are extracted. FIG. 5B illustrate feature points FP1. extracted from the goal image schematically as dots, in the state of being superimposed on the goal image. The number of the extracted feature points FP1 can vary depending on the content of the goal image or the image processing algorithm, and preferably 200 to 300 feature points FP1 are extracted.

The image exemplified in FIG. 5B can be displayed in the image data display portion V100 of the user interface image illustrated in FIG. 4A. In the case where the user has determined that there is a problem in the processing result by looking at the display screen, the user can select the image pickup button V101 to execute steps S11 and S12 again.

As image features that are evaluated when extracting the feature points, for example, local feature values that are invariable with respect to rotation, enlargement, and size reduction such as scale-invariant feature transform: SIFT, speeded-up robust features: SURF, and accelerated KAZE: AKAZE can be used. For example, in the case of using SIFT as the image feature, key points in the image are extracted by difference of Gaussian: DoG processing, and key points having a principal curvature or contrast equal to or higher than a preset threshold value are extracted as the feature points. Particularly, in the case of using SIFT, the feature value of each key point may be calculated as preparation for subsequent processing. Alternatively, in the case of using an image template as the image feature, regions of a specific size extracted from the current image are all used as the feature points.

Next, in step S13, feature points that are referred to for the visual servo control are selected from the feature points extracted in step S12. The feature points selected herein will be hereinafter referred to as "goal feature points". As the goal feature points, points having image features that are highly identifiable among the extracted feature points, such as points with high corner intensity or high edge intensity, are selected. In the selection of the goal feature points, for example, the user may designate highly identifiable feature points by using the input device 102 while looking at the display screen exemplified in FIG. 5B. Alternatively, the feature point extraction portion 106 may evaluate the image feature (identifiability) of each feature point, and feature points of a number within a range specified by the user in advance may be automatically selected from feature points with higher evaluation values.

In the present embodiment, a plurality of goal feature points is selected such that the number of the extracted goal feature points exceeds a minimum feature point number L. The minimum feature point number L is the number of feature points that are required for the sum of the values of the degree of freedom of the information that the feature points have to be equal to or larger than the value of degree of freedom required for the visual servo control.

To be noted, in the case where the number of coordinate axes (degree of freedom) for which feedback control is performed is represented by n and the value of degree of freedom of the information that the goal feature point has is represented by $\psi$, a minimum integer M satisfying $M > (n+1)/\psi$ can be also referred to as a minimum feature point number L. n may be also referred to as a degree of freedom n, and $\psi$ may be also referred to as a degree of freedom $\psi$.

Here, the degree of freedom of the information that the plurality of feature points have is considered as follows. Typically, coordinate information on the image is used in the visual servo control algorithm. For example, image feature values (local feature values) that are invariable with respect to rotation, enlargement, and size reduction such as SIFT, SURF, and AKAZE can be used, and in the case of using such an image feature value, each feature point has information of image coordinates (u, v), which is information having a degree of freedom of 2. Therefore, the sum of the values of the degree of freedom of the information that the plurality of feature points have is twice the number of the feature points.

In addition, the degree of freedom required for the visual servo control is a number obtained by adding 1 to the number of coordinate axes (degree of freedom) for which feedback control is performed in a coordinate space expressing the task space, that is, the space where the robot performs work. For example, in the case where the workpiece 4 is stationary without being bound by a guide or the like, translational axes (x, y, z) and rotational axes ($\omega$x, $\omega$y, $\omega$z) are naturally set as the coordinate axes for which feedback control is performed, and the total number of the coordinate axes (degree of freedom) is 6. In this case, the degree of freedom required for visual servo control is an integer obtained by adding 1 to 6, that is, 7. To be noted, in the case where the posture of the workpiece 4 is fixed by being bound by a guide or the like, the coordinate axes for which feedback control is performed can be set to only translational axes, which have a degree of freedom of 3, or to only a linear motion, which has a degree of freedom of 1. In such a case, a number obtained by adding 1 to that number serves as the value of the degree of freedom required for the visual servo control.

Figure 5C:
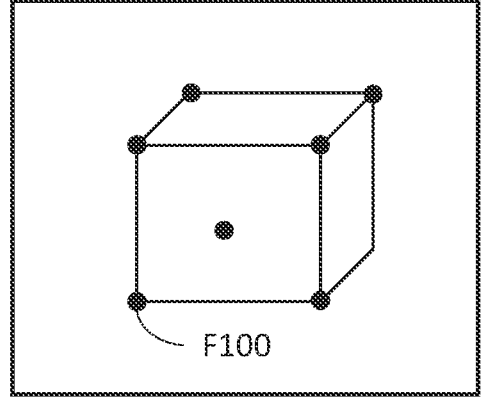
FIG. 5C illustrates an example in which goal feature points extracted in the first embodiment are superimposed on the goal image.

For example, in the case of performing feedback control of a degree of freedom of 6, the value of degree of freedom required for the visual servo control is 7, and the sum of the values of degree of freedom of the information that the plurality of feature points have needs to be 7 or more. In the case of using a local feature value that is invariable with respect to rotation and change in scale and has a degree of freedom of 2, the minimum feature point number L for making the sum of the values of degree of freedom of the information that the feature points have 7 or more is 4 because 2×4 is larger than 7. The feature point extraction portion 106 extracts goal feature points of a number larger than 4, which is the minimum feature point number L. That is, the feature point extraction portion 106 extracts five or more goal feature points. FIG. 5C illustrates an example in which seven goal feature points F100 are extracted from a larger number of feature points FP1 illustrated in FIG. 5B.

To be noted, the plurality of goal feature points may be also extracted by using an image feature that is not invariable with respect to rotation and change in scale, such as an image corner or an image template. In the case of extracting such an image feature with posture information, each feature point has a degree of freedom of 3 or more. As shown in this case, the minimum feature point number L changes depending on how the image feature is selected, and thus the number of goal feature points that should be extracted can also change in accordance with this.

The control program may be configured to execute step S11 and later steps again in the case where the feature point extraction portion 106 has determined that the number of the goal feature points extracted in step S13 does not satisfy a predetermined condition. In the case where the number of the goal feature points is N, the predetermined condition is, for example, L+1≤N≤L+40.

The extracted goal feature points can be each associated with information specifying an image feature corresponding to a specific portion of the target object, coordinate information on the image, and distance information. To be noted, the distance information is the distance from the image sensor surface to the feature point as viewed in an optical axis direction of the image pickup apparatus 3, that is, a z coordinate in the camera coordinate system. In the case where the image pickup apparatus 3 is a stereo camera, the distance information can be calculated from a stereo image, and otherwise, the distance information can be measured by using a three-dimensional sensor, or the user can obtain the distance information by actual measurement.

Next, in step S14, the information related to the goal feature points selected in step S13 is stored in a storage portion such as the storage device 104 or the main storage device (RAM) of the control apparatus 101 such that the information can be referred to in the later stage of the processing. The control program may be configured such that the feature point extraction portion 106 automatically executes that processing. Alternatively, the control program may be configured such that the user interface screen exemplified in FIG. 4A is displayed on the display screen of the output device 103 and user operation on the registration button V102 via the input device 102 is received.

By executing steps S11 to S14, processing for setting the goal feature points is completed for one goal position, and in step S15, whether or not the processing for setting the goal feature point has been completed for all the goal positions is determined. In the case where the processing is not completed for all the goal positions, that is, in the case where the result of step S15 is NO, the processing proceeds to step S16 to move the robot 1 to the next goal position, and processing of step S11 and later steps is performed. In the case where the processing has been completed for all the goal positions, that is, in the case where the result of step S15 is YES, the processing for setting the goal feature points is finished.

In the case where setting the goal feature points is completed, since the preparation for operating the robot 1 by visual servo control is finished, the robot system may cause the robot 1 to start the actual work, or may keep the robot 1 standing by until an arbitrary timing for starting the actual work. In addition, in the case of causing the robot 1 to repeatedly perform the same work operation such as the case of repeatedly manufacturing the same product, the processing for setting the goal feature points may be performed only once, and the visual servo control may be executed with reference to the goal feature points each time the work operation is performed.

Visual Servo Control

Processing of causing the robot 1 to perform the work operation by using the visual servo control will be described with reference to FIG. 3. When the visual servo control is started, in step S20, the feature matching portion 107 loads the information related to the goal feature points set for the first goal position from the storage device 104 or the main storage device (RAM) of the control apparatus 101.

Next, in step S21, the image obtaining portion 105 controls the image pickup apparatus 3 to obtain a current image from the image pickup apparatus 3, and stores the current image in the main storage device (RAM) of the control apparatus 101. In the description below, an image captured by the image pickup apparatus 3 in a state in which the robot 1 is in a current position and posture will be referred to as a "current image".

The field angle of the image pickup apparatus 3 at the time of capturing the current image is set such that the target object whose positional relationship with the robot 1 should be evaluated is imaged. For example, in the case of a work operation of approaching the workpiece 4 to grip the workpiece 4, at least part of the workpiece 4 is captured in the current image. In addition, for example, in the case of a work operation of conveying the gripped workpiece 4 to the tray, at least part of the tray is captured in the current image. As described above, a current image corresponding to the positional relationship between the robot serving as a movable portion and the workpiece (or the tray) serving as a target object is captured. To be noted, in the case where the image pickup apparatus 3 is not attached to the robot 1 and disposed at a position separate from the robot 1, a current image corresponding to the positional relationship between the robot serving as a movable portion and the workpiece (or the tray) serving as a target object is captured by the image pickup apparatus 3.

The current image can include information related to the positional relationship between the robot serving as a movable portion and the workpiece (or the tray) serving as a target object. The goal image and the current image may be in such a relationship that feedback control (visual servo) based on the difference between the goal image and the current image can be performed. To be noted, the target object captured in the goal image and the target object captured in the current image do not need to be the same object. For example, the target object captured in the goal image may be a sample of the workpiece 4, and the target object captured in the current image may be a mass-produced product of the workpiece 4. In addition, the apparatus whose positional relationship with the target object is defined in the goal image and the apparatus whose positional relationship with the target object is defined in the current image does not need to be the same apparatus. For example, the apparatus whose positional relationship with the target object is defined in the goal image may be a robot for a test, and the apparatus whose positional relationship with the target object is defined in the current image may be a robot for mass-production. The goal image does not have to be an actually photographed image, and may be a computer graphics image: CG image corresponding to a simulated positional relationship between the robot 1 and the workpiece 4.

Figure 6A:
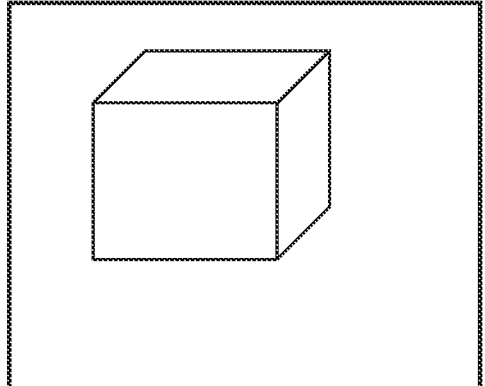
FIG. 6A illustrates an example of a current image obtained in the first embodiment.

FIG. 6A illustrates an example of an obtained current image. In this example, the workpiece 4 is imaged by the image pickup apparatus 3. To be noted, the current image may be displayed on the screen of the output device 103 so as to be checked by the user, or may be stored in the storage device 104 to be used later as data.

When the current image is obtained, in step S22, the feature point extraction portion 106 performs image processing on the current image and extracts a plurality of feature points. For the sake of convenience of description, the feature points extracted from the current image in step S22 will be referred to as "candidate feature points". As the method for extracting the candidate feature points from the current image, the same method as the method used for extracting the feature points from the goal image in step S12 can be used.

For example, in the case of using SIFT as the image feature, key points in the image are extracted by DoG processing, and key points having a principal curvature or contrast equal to or higher than a preset threshold value are extracted as the feature points. Particularly, in the case of using SIFT, the feature value of each key point may be calculated as preparation for subsequent processing. Alternatively, in the case of using an image template as the image feature, regions of a specific size extracted from the current image are all used as the feature points. To be noted, in the case where extraction of the candidate feature points and matching processing can be simultaneously performed easily, such as the case of using an image template, step S22 and step S23 may be performed collectively.

Figure 6B:
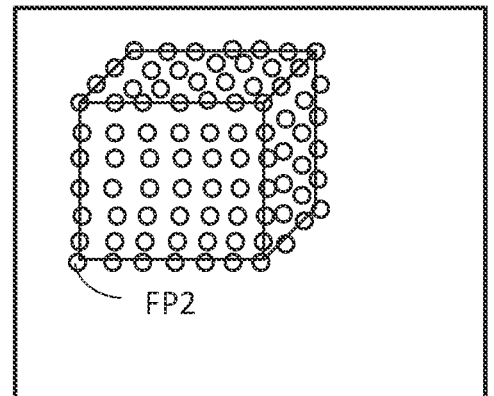
FIG. 6B illustrates an example in which candidate feature points extracted in the first embodiment are superimposed on the current image.

FIG. 6B schematically illustrates an example in which candidate feature points FP2 extracted from the current image exemplified in FIG. 6A are superimposed on the current image. To be noted, the candidate feature points may be displayed on the screen of the output device 103 to be checked by the user, or may be stored in the storage device 104 to be used later as data.

To be noted, to address a case where the current image has not been obtained in appropriate imaging conditions due to the influence of sudden external light or the like, whether or not the number of the candidate feature points FP2 extracted in step S22 satisfies a predetermined condition may be determined. The control program may be configured to execute step S21 and later steps again in the case where it has been determined that the predetermined condition is not satisfied. This is because, to secure the degree of freedom (number of control axes) required for the visual servo control, a sufficient number of the candidate feature points FP2 need to be extracted. The predetermined condition may be, for example, (minimum feature point number L+1)$\leq$ (number of candidate feature points), or (number of goal feature points)<(number of candidate feature points).

Figure 6C:
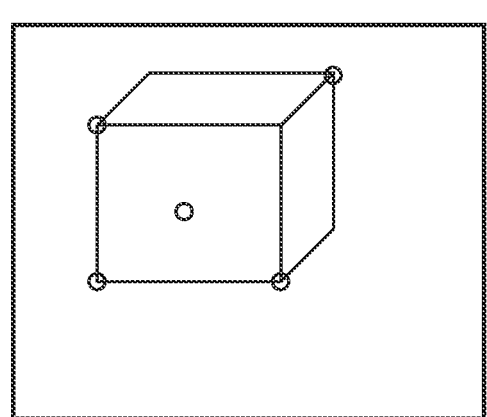
FIG. 6C illustrates an example in which current feature points extracted from the candidate feature points in the first embodiment are superimposed on the current image.

Next, in step S23, matching information is generated by performing matching processing between the candidate feature points and the goal feature points. In the description below, for the sake of convenience, ones of candidate feature points associated with the goal feature points by the matching will be referred to as "current feature points". FIG. 6C schematically illustrates an example in which the current feature points extracted from the candidate feature points illustrated in FIG. 6B are superimposed on the current image.

The matching information is a vector having information of the goal feature points and information of the current feature points corresponding to the goal feature points. In the matching, for example, in the case of using SIFT as the feature value, a calculation method in which the feature value vectors of all the combinations of the candidate feature points FP2 and the goal feature points F100 are compared and the current feature point corresponding to each goal feature point is found can be used.

For example, in the case of using N SIFT feature points as the goal feature points, the matching information (vector) includes information $(u1d, v1d, z1d, u2d, v2d, z2d, \ldots, uNd, vNd, zNd)$ of the goal feature points and information $(u1c, v1c, z1c, u2c, v2c, z2c, \ldots, uNc, vNc, zNc)$ of the current feature points. Here, $uhd$, $vhd$, and $zhd$ respectively indicate the x coordinate, y coordinate, and z coordinate of the h-th goal feature point, and $uhc$, $vhc$, and $zhc$ respectively indicate the x coordinate, y coordinate, and z coordinate of the current feature point corresponding to the h-th goal feature point $(1 \leq h \leq N)$. To be noted, in the case of not estimating (evaluating) the z coordinate of the current feature point, the information of the z coordinate does not have to be included.

Figure 6D:
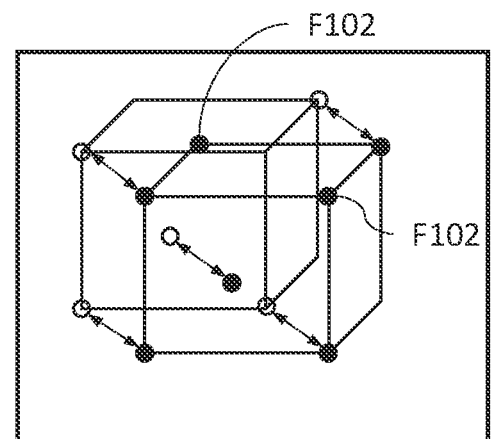
FIG. 6D is a diagram illustrating a result of matching processing between the goal feature points and the candidate feature points in the first embodiment.

In the matching, in the case where no current feature point corresponding to a certain goal feature point is not detected in the candidate feature points, the goal feature point may be excluded from the matching information. As has been described, in the present embodiment, the number of the goal feature points is set to exceed the minimum feature point number L. Since the minimum feature point number L is the number of feature points that are required for the sum of the degree of freedom of the information that the feature points have to be equal to or larger than the degree of freedom required for the visual servo control, the goal feature points of a number allowing redundancy is set in the present embodiment. Therefore, information about the degree of freedom required for the visual servo control can be obtained without using all the goal feature points. FIG. 6D illustrates an example of a result of matching processing between the goal feature points F100 illustrated in FIG. 5C and the candidate feature points FP2 illustrated in FIG. 6B. The association between the goal feature points and the current feature points is indicated by arrows, and two goal feature points for which corresponding current feature points have not been detected from the candidate feature points are illustrated as goal feature points F102. The two goal feature points F102 for which the current feature points have not been detected are excluded from the matching information.

Figure 4B:
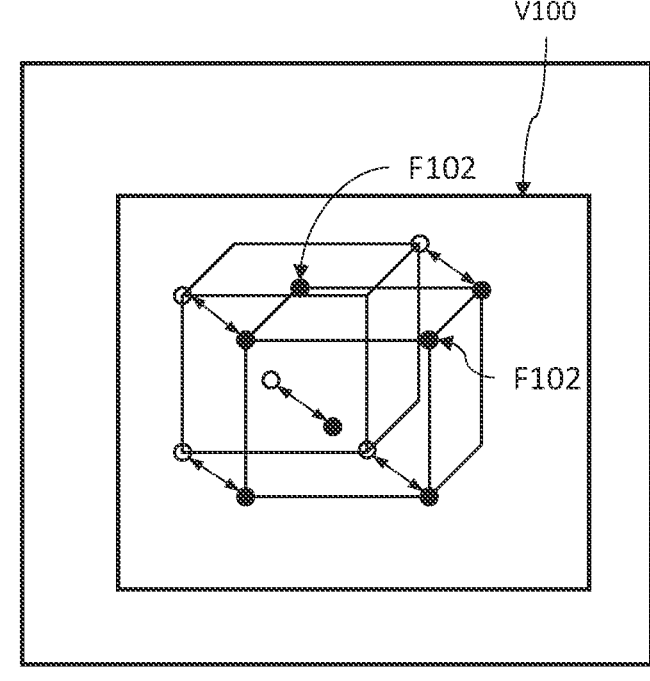
FIG. 4B illustrates an example of a screen indicating a matching result displayed on an output device in the first embodiment.

The result of the matching processing may be displayed on the display screen of the output device 103 if necessary. FIG. 4B illustrates an example of a screen in the case of displaying the matching result on the output device 103. By displaying the current feature points and the goal feature points together with the current image and the goal image on the image data display portion V100, the user can recognize whether or not the matching of the feature points is performed properly. If arrows or the like indicating the association between the current feature points and the goal feature points are displayed as in the illustrated example, the user can easily recognize whether or not the matching of the feature points is properly performed. In addition, displaying, in an identifiable manner, the goal feature points F102 for which corresponding current feature points have not been detected is also a preferable display method.

Next, in step S24, an image Jacobian is generated from the matching information obtained in step S23. The image Jacobian is a matrix Ji satisfying the formula (1). To be noted, e' represents the speed of coordinates of a current feature point in the image, and v represents minimal movement of the image pickup apparatus 3.

$$e' = J_i v \tag{1}$$

In a classical image-based visual servo of a degree of freedom of 6 using feature point coordinates, if e' is set to (du1c/dt, dv1c/dt, du2c/dt, dv2c/dt . . . ), the matrix Ji as the image Jacobian is set as expressed by the formula (2). To be noted, f represents the focal length of the image pickup apparatus 3.

$$J_i = \begin{vmatrix} -\dfrac{f}{z_{1c}} & 0 & \dfrac{u_{1c}}{z_{1c}} & \dfrac{u_{1c}v_{1c}}{f} & -f - \dfrac{u_{1c}^2}{f} & v_{1c} \\ 0 & -\dfrac{f}{z_{1c}} & \dfrac{v_{1c}}{z_{1c}} & f + \dfrac{v_{1c}^2}{f} & -\dfrac{u_{1c}v_{1c}}{f} & -u_{1c} \\ -\dfrac{f}{z_{2c}} & 0 & \dfrac{u_{2c}}{z_{2c}} & \dfrac{u_{2c}v_{2c}}{f} & -f - \dfrac{u_{2c}^2}{f} & v_{2c} \\ 0 & -\dfrac{f}{z_{2c}} & \dfrac{v_{2c}}{z_{2c}} & f + \dfrac{v_{2c}^2}{f} & -\dfrac{u_{2c}v_{2c}}{f} & -u_{2c} \\ & & & \vdots & & \\ -\dfrac{f}{z_{Nc}} & 0 & \dfrac{u_{Nc}}{z_{Nc}} & \dfrac{u_{Nc}v_{Nc}}{f} & -f - \dfrac{u_{Nc}^2}{f} & v_{Nc} \\ 0 & -\dfrac{f}{z_{Nc}} & \dfrac{v_{Nc}}{z_{Nc}} & f + \dfrac{v_{Nc}^2}{f} & -\dfrac{u_{Nc}v_{Nc}}{f} & -u_{Nc} \end{vmatrix} \tag{2}$$

To be noted, in step S23 described above, current feature points are not necessarily detected for all the goal feature points. In the case where there is a goal feature point for which the current feature point is not detected, the image Jacobian is generated by excluding that goal feature point. For example, in the case where N is 5 and the current feature point corresponding to the fourth goal feature point is not detected, the image Jacobian is as expressed by the formula (3).

$$J_i = \begin{vmatrix} -\dfrac{f}{z_{1c}} & 0 & \dfrac{u_{1c}}{z_{1c}} & \dfrac{u_{1c}v_{1c}}{f} & -f - \dfrac{u_{1c}^2}{f} & v_{1c} \\ 0 & -\dfrac{f}{z_{1c}} & \dfrac{v_{1c}}{z_{1c}} & f + \dfrac{v_{1c}^2}{f} & -\dfrac{1}{f}u_{1c}v_{1c} & -u_{1c} \\ -\dfrac{f}{z_{2c}} & 0 & \dfrac{u_{2c}}{z_{2c}} & \dfrac{u_{2c}v_{2c}}{f} & -f - \dfrac{u_{2c}^2}{f} & v_{2c} \\ 0 & -\dfrac{f}{z_{2c}} & \dfrac{v_{2c}}{z_{2c}} & f + \dfrac{v_{2c}^2}{f} & -\dfrac{1}{f}u_{2c}v_{2c} & -u_{2c} \\ -\dfrac{f}{z_{3c}} & 0 & \dfrac{u_{3c}}{z_{3c}} & \dfrac{u_{3c}v_{3c}}{f} & -f - \dfrac{u_{3c}^2}{f} & v_{3c} \\ 0 & -\dfrac{f}{z_{3c}} & \dfrac{v_{3c}}{z_{3c}} & f + \dfrac{v_{3c}^2}{f} & -\dfrac{u_{3c}v_{3c}}{f} & -u_{3c} \\ -\dfrac{f}{z_{5c}} & 0 & \dfrac{u_{5c}}{z_{5c}} & \dfrac{u_{5c}v_{5c}}{f} & -f - \dfrac{u_{5c}^2}{f} & v_{5c} \\ 0 & -\dfrac{f}{z_{5c}} & \dfrac{v_{5c}}{z_{5c}} & f + \dfrac{v_{5c}^2}{f} & -\dfrac{u_{5c}v_{5c}}{f} & -u_{5c} \end{vmatrix} \tag{3}$$

A known method can be used for the setting of the image Jacobian in accordance with the design of the system. For example, the coordinates of the goal feature points may be used instead of the coordinates of the current feature points. Alternatively, the average of an image Jacobian calculated by using the goal feature points and an image Jacobian calculated by using the current feature points may be used, or an image Jacobian corresponding to only the movement of the image pickup apparatus 3 in some directions may be used. In addition, in the case where the z coordinates of the current feature points cannot be estimated, the image Jacobian may be calculated by using the x and y coordinates of the current feature points and the z coordinates of the goal feature points.

To be noted, in the case of performing visual servo control in a system in which the image pickup apparatus 3 does not move together with the robot 1, that is, in a system in which the robot and the target object are imaged by using an image pickup apparatus whose position is fixed, the image Jacobian may be appropriately modified for use.

Next, in step S25, a feedback amount for the robot 1 is calculated by using the matching information generated in step S23 and the image Jacobian generated in step S24. In a classical image-based visual servo, the motion vg of the image pickup apparatus 3 controlled by the operation of the robot 1 is calculated by the formula (4).

$$vg = \lambda J_i^+ e \tag{4}$$

Here, e represents the difference (u1c−u1d, v1c−v1d, u2c−u2d, v2c−v2d . . . ) between the current feature points and the goal feature points, Ji+ represents a pseudo-inverse matrix of the image Jacobian, and λ represents the feedback gain. It is preferable that the feedback gain is stored in the storage device 104 or the main storage device (RAM) of the control apparatus 101 in advance and loaded at the time of executing the calculation processing. The feedback gain λ is typically smaller than 1, and preferably a small value of about 0.1 is set as the feedback gain λ. The method of calculating vg by the formula (4) is merely an example, and other known methods can be freely used.

In step S26, the robot control portion 108 convert the feedback amount calculated in step S25 into a control signal that can be interpreted by the robot 1, and transmits the control signal to the robot 1. For example, in the case where the robot 1 is capable of interpreting the motion vg of the image pickup apparatus 3 as a control signal, the calculation result in step S25 may be directly transmitted to the robot 1.

In the case where the control signal of the robot 1 is a joint angular velocity of each joint of the robot 1, the motion vg of the image pickup apparatus 3 is converted into the joint angular velocity of each joint of the robot 1 by using a robot Jacobian or the like, and is then transmitted to the robot 1. In addition, the control amount may be modified by proportional-integral-derivative control: PID control or the like such that the robot 1 operates smoothly. As a result of this processing, the robot control portion 108 can operate the robot 1 such that the difference between the current feature points and the goal feature points is reduced. That is, the position and posture of the, robot 1 can be controlled in such a direction as to match the goal image with the current image.

Next, in step S27, whether or not the robot 1 has reached a position and posture within an allowable difference from the current goal position set in the series of work operations. For example, in the case where the feedback amount calculated in step S25 exceeds a predetermined range, it is determined that the position and posture of the robot 1 has not settled in the vicinity of the goal position yet, that is, the result of step S27 is NO. In this case, the process returns to step S21, and processing of obtaining the current image and processing of later steps are executed again. By repeatedly performing the loop processing from step S21 to NO of step S27 fast, for example, the positional relationship between the workpiece 4 and the end effector 2 of the robot 1 can be settled in a goal positional relationship.

To be noted, the required positional precision may differ for each goal position depending on the details of the work operation. For example, there is a case where, in an operation of causing the end effector 2 to approach the workpiece 4 to the vicinity of the workpiece 4, shorter movement time is desired more than high positional precision, and in an operation of bringing the end effector 2 into contact with the workpiece 4, high positional precision may be desired. In such a case, the control program can be configured such that the determination criterion of step S27 can be appropriately modified in accordance with the goal position.

Incidentally, in the case where the position and posture of the robot 1 does not settle in the goal position even after repeatedly performing the loop processing from step S21 to NO of step S27 a large number of times, there is a possibility that some kind of abnormality such as a mechanical failure has occurred in the robot 1. Therefore, the robot control portion 108 may be configured to count the number of times of the loop processing, and the control program may be configured such that the process proceeds to an error processing in the case where the determination result of step S27 is NO even after the count has reached a predetermined number. The control program may be configured such that, as the error processing, for example, an error notification is displayed on the display screen of the output device 103, an alarm is issued by using a warning sound or a warning light, or an error notification e-mail is transmitted to the user.

In contrast, in the case where the feedback amount calculated in step S25 is equal to or smaller than the predetermined amount, it is determined that the position and posture of the robot 1 has reached a position close enough to the goal position, that is, the result of step S27 is YES, and the process proceeds to step S28.

In step S28, whether or not a series of operations of the robot 1 that should be controlled by visual servo control have been completed. In other words, whether or not the visual servo control processing has been completed for all the series of goal points set in accordance with the details of the work operation is determined.

In the case where there is a goal position for which the visual servo control is not completed, that is, in the case where the result of step S28 is NO, the process proceeds to step S29, the information of the goal feature points associated with the next goal position is loaded from the storage device, and the processing of step S21 and processing of later steps are executed again. When processing has been completed for all the goal positions, that is, when the result of step S28 is YES, the visual servo control is finished.

Merits of First Embodiment

Merits of the present embodiment will be described in comparison with conventional visual servo control. To be noted, in the description below, a case where the number of coordinate axes for which feedback control is performed in the task space is 6 and a local feature value such as SIFT is used as the image feature will be described.

An image processing method performed in conventional visual servo control will be described with reference to FIGS. 7A to 7D. FIG. 7A illustrates an example of a goal image captured by a camera, and corresponds to FIG. 5A referred to in the description of the present embodiment. FIG. 7B illustrates goal feature points F100 extracted from the goal image by the conventional method. In the present embodiment described with reference to FIG. 5C, more goal feature points F100 than the minimum feature point number L, for example, seven goal feature points F100 are extracted. In contrast, in the conventional method, goal feature points F100 equal to or less than the minimum feature point number L, for example, four goal feature points F100 are extracted as exemplified in FIG. 7B.

FIG. 7C illustrates current feature points F101 extracted from the current image by the conventional method. In FIG. 7D, a correspondence relationship between the current feature points F101 and goal feature points is indicated by arrows for the sake of convenience of description. To be noted, FIGS. 7A to 7D are drawings provided for convenience of description of the conventional visual servo control, and it is not intended that these images are displayed on the screen of the output device.

In the conventional method, as illustrated in FIG. 7B, goal feature points of a number to secure enough redundancy are not extracted. Therefore, to secure current feature points of a number required for feedback control, all the candidate feature points extracted from the captured current image and the goal feature points F100 need to be successfully matched with each other as illustrated in FIG. 7C. However, in the case where the target object does not include a feature portion (for example, a marker) that is easily identifiable in an image, it may be difficult to extract the candidate feature points corresponding to the goal feature points from the current image depending on the position and posture of the target object. For example, in the case where a corresponding current feature point of at least one of the goal feature points illustrated in FIG. 7B cannot be determined, current feature points of a number required for appropriately performing feedback control cannot be secured. Also, in the case where the four extracted current feature points include an erroneously detected feature point, the feedback control cannot be appropriately performed.

In contrast, in the present embodiment, more goal feature points F100 than the minimum feature point number L are extracted as exemplified in FIG. 5C to secure redundancy. In step S23 in which feature point matching processing is performed, even if there is a goal feature point F102 for which a corresponding candidate feature point FP2 cannot be detected, four or more current feature points are likely to be secured as exemplified in FIG. 6D, and therefore the visual servo control can be appropriately executed.

That is, according to the present embodiment, information required for appropriately performing visual servo control can be stably obtained from captured images, and therefore the visual servo processing can be executed at a higher reliability than in related art.

Second Embodiment

Figure 8:
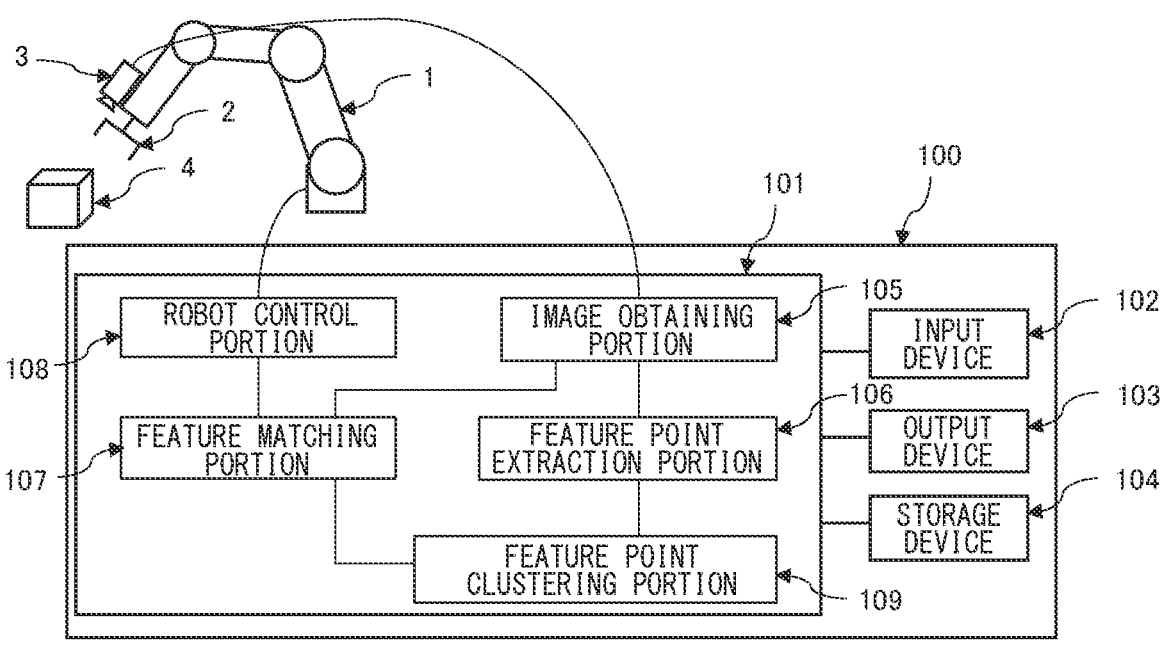
FIG. 8 is a schematic view of a robot system according to a second embodiment illustrating a schematic configuration thereof.

FIG. 8 is a schematic diagram illustrating a schematic configuration of a robot system that is a system according to a second embodiment. The robot system includes the robot 1 and the controller 100 serving as a control portion. Description of elements and processing common to the first embodiment will be simplified or omitted.

The robot 1 is, for example, a multi-axis controllable articulated robot, but the robot 1 may be a robot of a different type or a movable apparatus. For example, the robot 1 may be an apparatus including a movable portion capable of performing expansion/contraction, bending, vertical movement, horizontal movement, turning, or a composite operation of these.

In the present embodiment, the control apparatus 101 includes a feature point clustering portion 109 in addition to the image obtaining portion 105, the feature point extraction portion 106, the feature matching portion 107, and the robot control portion 108. The feature point clustering portion 109 has a function of dividing goal feature points and current feature points extracted by the feature point extraction portion 106 into a plurality of clusters, and calculating representative information of each cluster.

Figure 9:
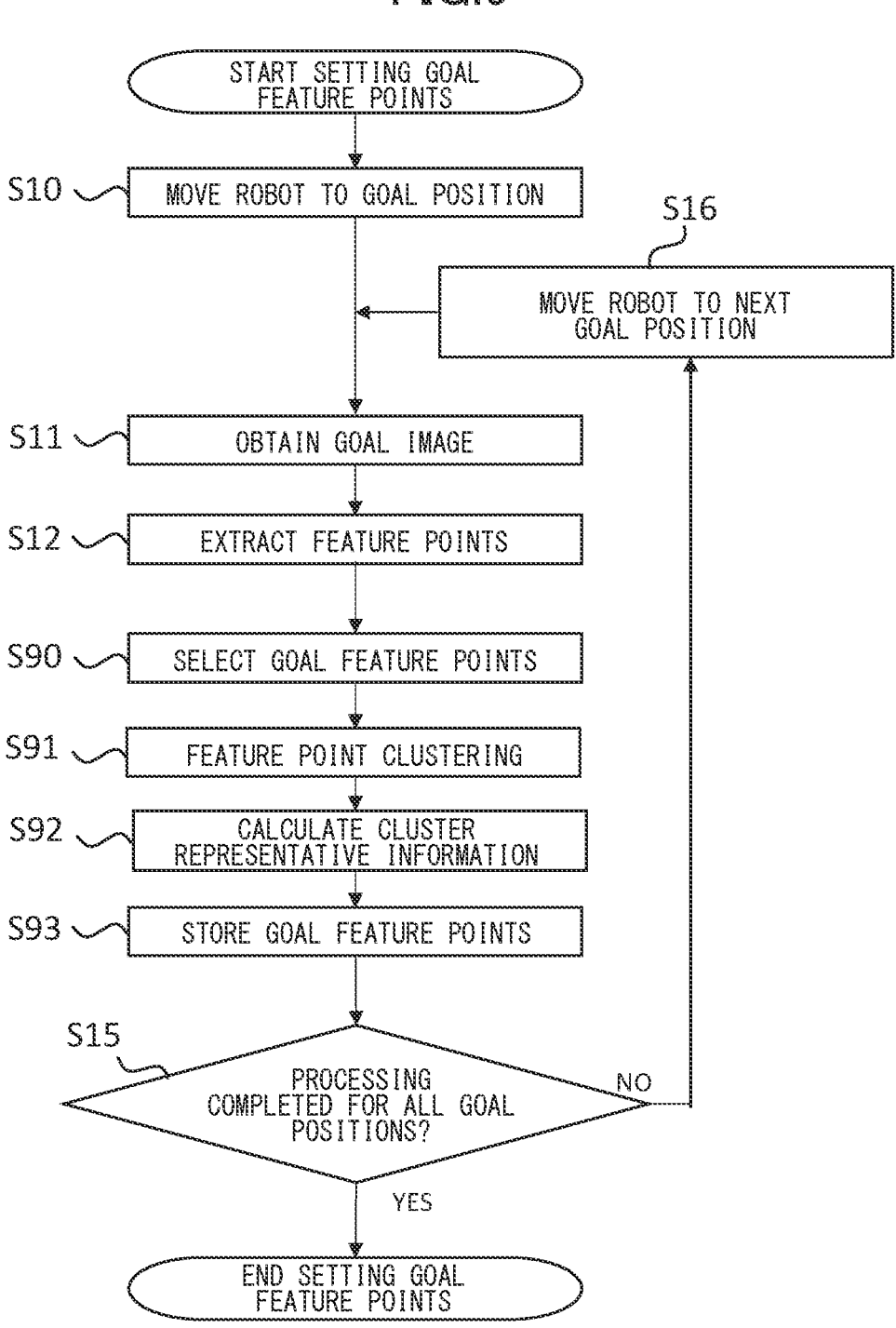
FIG. 9 is a flowchart illustrating a flow of processing of setting goal feature points in the second embodiment.
Figure 10:
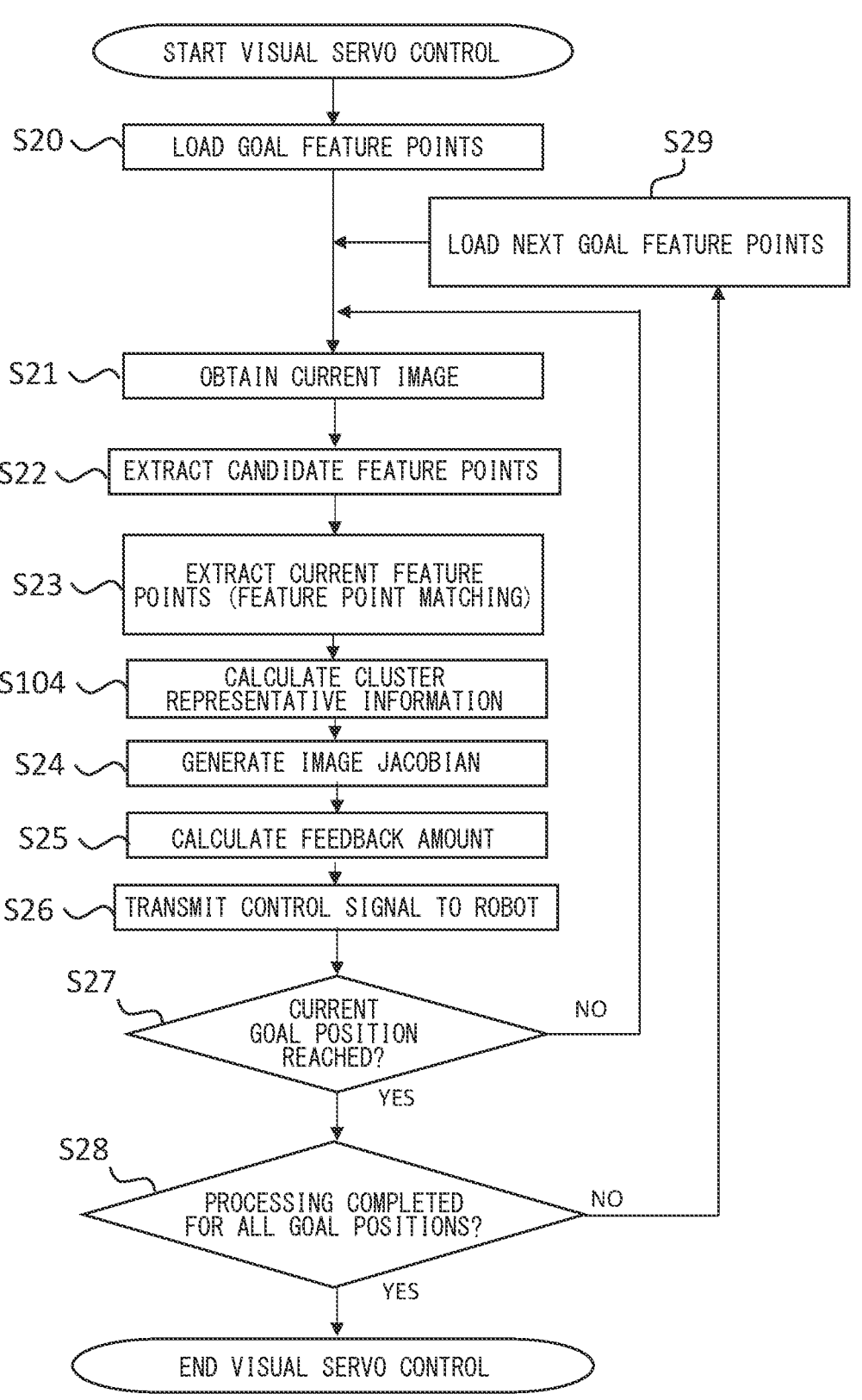
FIG. 10 is a flowchart illustrating a flow of processing of controlling the operation of a robot by visual servo control using information of the goal feature points in the second embodiment.

Visual servo control in the robot system according to the present embodiment will be described. FIG. 9 is a flowchart illustrating a flow of processing of, as preparation for the visual servo control, moving the robot 1 to the goal position and causing the image pickup apparatus 3 to perform imaging in advance, and extracting the goal feature points, goal feature point clusters, and goal feature point cluster representative information on the basis of the obtained image. In addition, FIG. 10 is a flowchart illustrating the flow of processing of controlling the operation of the robot 1 by visual servo control. This will be sequentially described below.

Preparation for Visual Servo Control

Figure 12A:
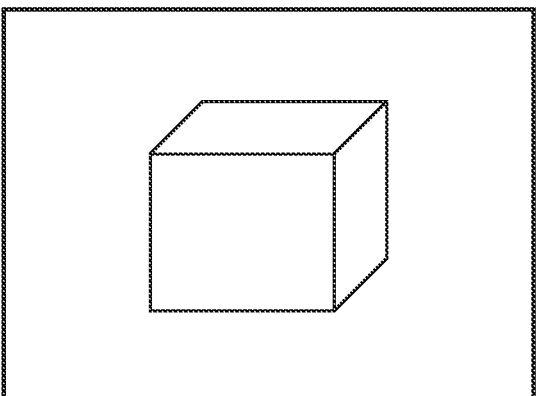
FIG. 12A illustrates an example of a goal image obtained in the second embodiment.
Figure 12B:
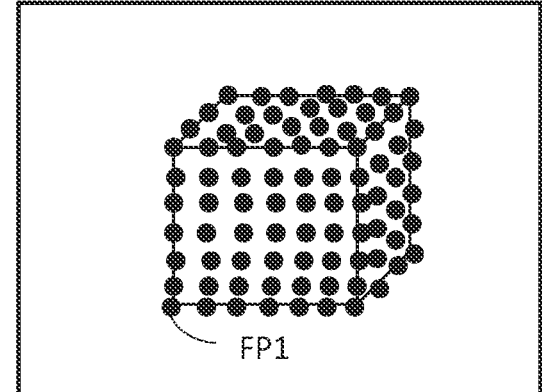
FIG. 12B illustrates an example in which feature points extracted from the goal image in the second embodiment are superimposed on the goal image.

In FIG. 9, processing of steps S10, S11, S12, S15, and S16 is the same as the processing described by using the same reference signs in the first embodiment. FIG. 12A illustrates an example of a goal image obtained in step S11. FIG. 12B schematically illustrates feature points FP1 extracted in step S12, in the state of being superimposed on the goal image.

In step S90 of the present embodiment, N goal feature points can be selected from the feature points extracted from the goal image in step S12 so as to satisfy the formula (5) where N is a plural number.

$$n + 1 \le \phi k \le \frac{\psi N}{2} \qquad (5)$$

Here, n represents the number of coordinate axes for which feedback control is performed in the task space, $\varphi$ represents the degree of freedom of information that one feature cluster has, k represents the number of clusters, $\psi$ represents the degree of freedom of information that each feature point has, and N represents the number of goal feature points selected by the feature point extraction portion 106. $\varphi$ and n are values set in advance, and are input by a user or loaded from a setting file or a program stored in the storage device 104 or the main storage device (RAM) before execution of step S90. The degree of freedom $\psi$ of the information that one goal feature point has is a value determined on the basis of the image feature used in the present embodiment, and may be automatically calculated in accordance with the type of the image feature, or nay be set in advance similarly to the degree of freedom $\varphi$ of the information that each goal feature point cluster has and the value n of degree of freedom for which the feedback control is performed. The number k of the goal feature point clusters and the value of N may be automatically calculated so as to satisfy n+1≤$\varphi$k≤$\psi$N/2, or may be set in advance similarly to $\psi$ and n. It is preferable that at least one of n+1≤$\varphi$k, $\varphi$k≤$\psi$N/2, and n+1≤$\psi$N/2 is satisfied. n+1≤$\varphi$k is equivalent to k≥(n+1)/$\varphi$, which represents a relationship similar to N>(n+1)/$\psi$ of the first embodiment. It is preferable that k>(n+1)/$\varphi$ is satisfied. $\varphi$k≤$\psi$N/2 is equivalent to N≥2k$\varphi$/$\psi$, and is equivalent to N≥2k if $\varphi$ is equal to $\psi$. If N≥2k is satisfied, each goal feature point cluster can be constituted by a plurality of goal feature points. It is preferable that N>2k$\varphi$/$\psi$, that is, $\varphi$k<$\psi$N/2 is satisfied. n+1≤$\psi$N/2 is equivalent to N≤2×(n+1)/$\psi$. Since L≥(n+1)/$\psi$ is satisfied, N≥2×L is satisfied. It is preferable that N>2×L is satisfied, and it is preferable that N>2×(n+1)/$\psi$, that is, n+1<$\psi$N/2 is satisfied.

Description of the image feature that can be used as the feature points and of the degree of freedom of the information that each image feature has is the same as in the description of step S13 in the first embodiment. For example, in the case where $\varphi$ is 2, k is 4, and SIFT is used as the image feature, the number N of feature points that should be extracted is 8 or more because $\psi$ is 2.

Figure 12C:
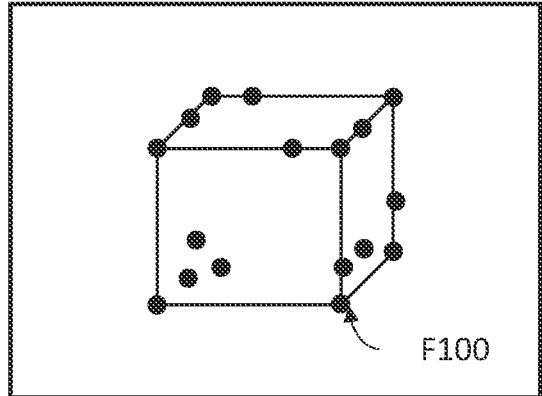
FIG. 12C illustrates an example in which goal feature points extracted in the second embodiment are superimposed on the goal image.

FIG. 12C schematically illustrates goal feature points F100 extracted in step S90 and superimposed on the goal image. The extracted goal feature points are stored in the storage device 104 or the main storage device (RAM) so as to be referred to in a later stage of processing.

In step S91, the feature point clustering portion 109 performs first clustering processing. That is, the N goal feature points selected in step S90 are divided into k clusters so as to satisfy the formula (5). k is a plural number, and the clusters are goal feature point clusters. For example, in the case where $\varphi$ is 2 and n is 6, k is 4 or more. Known methods can be freely used for the clustering. For example, by dividing the feature points on the basis of the image coordinates of the feature points by using hierarchical cluster analysis using nearest neighbor algorithm, clustering methods such as the k-means method, or the like, feature points physically close to each other can be included in the same cluster. That is, the clustering may be performed on the basis of a distance in the goal image. Alternatively, if superpixel division using the Slic method, Watershed method, or the like and feature points in the same superpixel are classified into the same cluster, feature points on the same surface are more likely to be gathered in the same cluster, and improvement in the calculation precision of affine transformation or the like that will be described later can be expected.

To be noted, the clustering may be performed on the basis of the luminance value (gradation level) of the goal feature points in the goal image. In addition, if the goal feature points are divided on the basis of the shape model of the workpiece 4 such that feature points on the same surface are included in the same goal feature point cluster, the calculation precision of the affine transformation or the like can be more reliably improved than in the method described above.

More preferably, if the division is performed such that each cluster includes at least two goal feature points, the goal feature point clusters can be detected even in the case where part of feature points included in each goal feature point cluster is not detected. In addition, in the case where the goal image includes the robot together with the workpiece such as a case where the image pickup apparatus is disposed not in the robot, the clustering may be performed on the basis of not only the shape model of the workpiece but also the shape model of the robot.

Figure 12D:
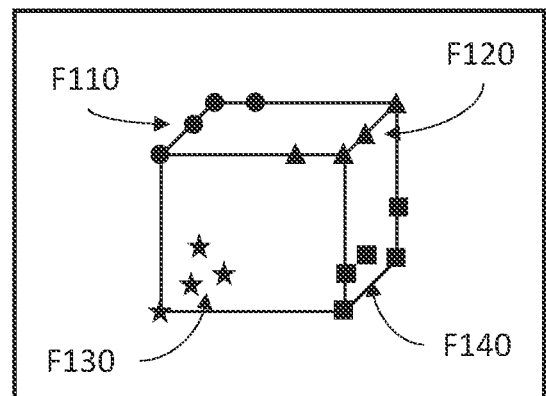
FIG. 12D illustrates an example in which a result of clustering of the goal feature points is superimposed on the goal image in the second embodiment.

FIG. 12D schematically illustrates a result of the clustering in step S91, in the state of being superimposed on the goal image. In the illustrated example, the goal feature points selected in step S90 are divided (classified) into four goal feature point clusters F110, F120, F130, and F140. In the drawing, the goal feature points constituting each goal feature point cluster are indicated by different marks for each goal feature point cluster.

Next, in step S92, the feature point clustering portion 109 calculates the goal feature point cluster representative information for each of the k goal feature point clusters obtained by the division in step S91. The goal feature point cluster representative information is information indicating the goal feature point cluster as one image feature, and is used later for feedback control. For example, the position of the center of gravity of the plurality of goal feature points included in the goal feature point cluster can be used as the goal feature point cluster representative information, and in this case, φ is 2. By performing the feedback control by using the cluster representative information, change in the precision of the control information to be fed back can be suppressed even in the case where the goal feature points constituting the goal feature point cluster has changed. One of the goal feature points included in a certain goal feature point cluster may be also used as the goal feature point cluster representative information of the certain goal feature point cluster.

To be noted, the goal feature point cluster representative information can also include a magnification ratio and/or a rotation angle that can be obtained by calculation of the affine transformation or the like that will be described later in addition to the position of the center of gravity of the goal feature points, and in this case, φ is 3 or 4. The processing result may be displayed on the output device 103 if necessary.

Figure 12E:
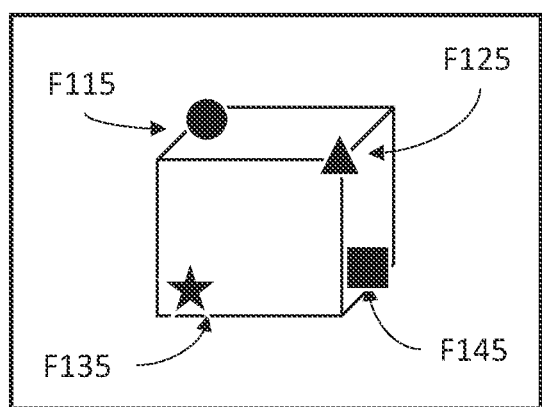
FIG. 12E illustrates an example in which goal feature point cluster representative information calculated in the second embodiment is superimposed on the goal image.

FIG. 12E schematically illustrates the result of calculation in step S92, in the state of being superimposed on the goal image. Goal feature point cluster representative information F115, goal feature point cluster representative information F125, goal feature point cluster representative information F135, and goal feature point cluster representative information F145 are schematically indicated by different marks.

In step S93, the goal feature point duster information and the goal feature point duster representative information are stored in the storage device 104 or the main storage device (RAM) so as to be referred to in the later stage of processing.

Figure 11A:
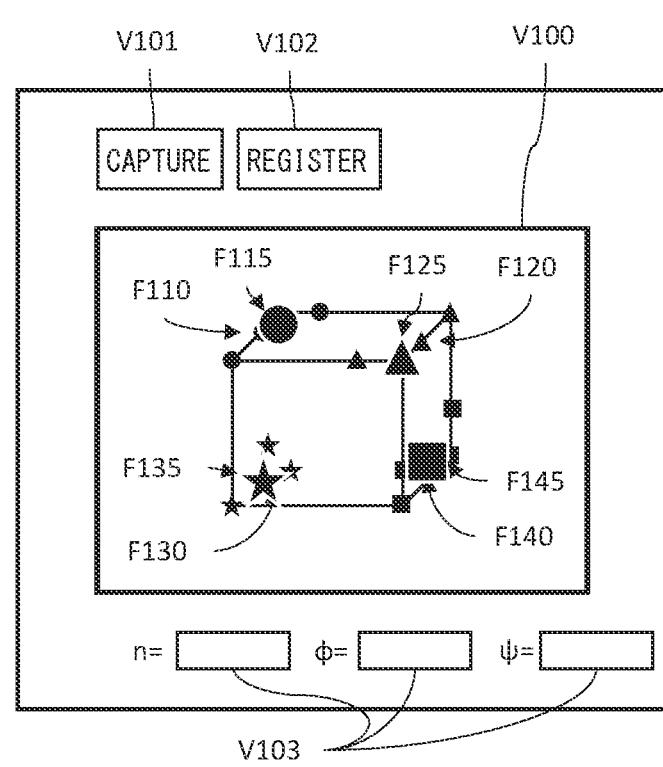
FIG. 11A is a diagram illustrating an example of a user interface screen that can be displayed in the second embodiment.

FIG. 11A illustrates an example of a display screen displayed on the output device 103 in steps S11, S12, S90, S91, S92, and S93 of the present embodiment. The display screen may include the image data display portion V100, the image pickup button V101, the registration button V102, and a parameter input field V103.

The parameter input field V103 can be used for the user to set parameters such as n, φ, and ψ by using the input device 102.

The user can operate the image pickup button V101 and the registration button V102 by using the input device 102. By turning on the image pickup button V101, the processing from step S11 to step S92 is started. In step S11, the image data display portion V100 displays, for example, the goal image illustrated in FIG. 12A, and in step S12, the image data display portion V100 displays, for example, the candidate feature points illustrated in FIG. 12B. In step S90, the image data display portion V100 displays the goal feature points illustrated in FIG. 12C. In addition, in step S91, for example, the clustering result illustrated in FIG. 12D is displayed, and in step S92, the image data display portion V100 displays, for example, the cluster representative information illustrated in FIG. 12E.

In each display screen, the goal feature points and the cluster representative information may be displayed as different figures or in different colors such that which goal feature point belongs to which cluster is understandable. The user may select the registration button V102 to record the processing result as the goal image and the goal feature points and proceed to the next step, or in the case where there is a problem in the processing result, select the image pickup button V101 again to execute the processing of step S11 and later steps again.

To be noted, all the display examples described above may or may not be executed, and the design of the screen may be appropriately modified. For example, the functions of the image pickup button V101 and the registration button V102 may be divided into a larger number of buttons, or may be realized by inputting a command. In addition, the parameter input field V103 is not necessarily needed, and the parameters may be written in a different file in advance, or may be set by command input.

Visual Servo Control

Figure 13A:
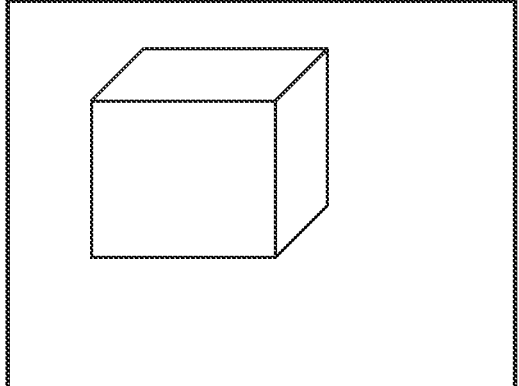
FIG. 13A illustrates an example of a current image obtained in the second embodiment.
Figure 13B:
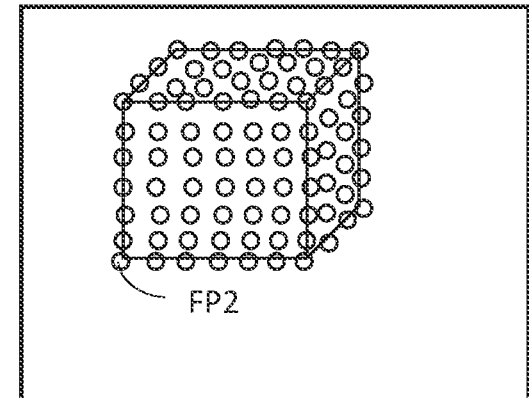
FIG. 13B illustrates an example in which candidate feature points extracted in the second embodiment are superimposed on the current image.

A procedure of causing the robot 1 to perform the work operations by using the visual servo control in the present embodiment will be described with reference to FIG. 10. The processing of each of steps S20 to S22 illustrated in FIG. 10 is the same as the processing described by using the same reference signs in FIG. 3 of the first embodiment. FIG. 13A illustrates an example of the current image obtained in step S21, and FIG. 13B illustrates an example in which the candidate feature points FP2 extracted in step S22 are superimposed on the current image. The image exemplified in FIG. 13A or 13B can be displayed on the display screen of the output device 103.

Also in step S23 of the present embodiment, matching information is generated by performing matching processing between the candidate feature points and the goal feature points similarly to the first embodiment. In the description below, for the sake of convenience, ones of candidate feature points associated with the goal feature points by the matching will be referred to as "current feature points".

In the matching, for example, in the case of using SIFT as the feature value, a calculation method in which the feature value vectors of all the combinations of the candidate feature points FP2 and the goal feature points F100 are compared and the current feature point corresponding to each goal feature point is found can be used.

For example, in the case of using N SIFT feature points as the goal feature points, the matching information (vector) includes information (u1d, y1d, z1d, u2d, v2d, z2d, . . . , uNd, vNd, zNd) of the goal feature points and information (u1c, v1c, z1c, u2c, v2c, z2c, . . . , uNc, vNc, zNc) of the current feature points. Here, uhd, vhd, and zhd respectively indicate the x coordinate, y coordinate, and z coordinate of the h-th goal feature point, and uhc, vhc, and zhc respectively indicate the x coordinate, y coordinate, and z coordinate of the current feature point corresponding to the h-th goal feature point (II is in the range of 1 to N). To be noted, in the case of not estimating the z coordinate of the current feature point, the information of the z coordinate does not have to be included.

In the matching, in the case where no current feature point corresponding to a certain goal feature point is not detected in the candidate feature points, the goal feature point may be excluded from the matching information. As has been described, in the present embodiment, since the number of the goal feature points is set to satisfy the formula (5), the goal feature points of a number allowing redundancy are set in the present embodiment. Therefore, information for the degree of freedom required for the visual servo control can be obtained without using all the goal feature points.

Figure 13C:
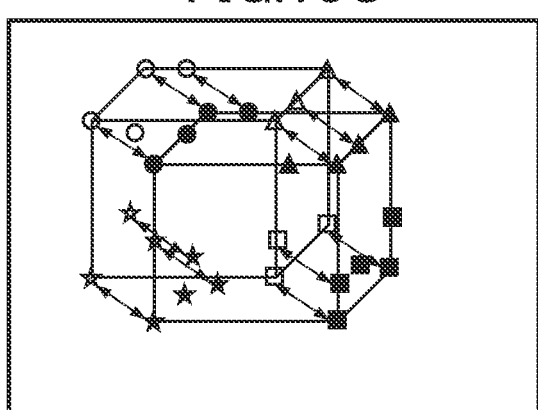
FIG. 13C illustrates an example in which the status of matching processing between the goal feature points and the candidate feature points in the second embodiment is schematically presented.

FIG. 13C schematically illustrates a status of matching processing between the goal feature points and the current feature points. The association between the goal feature points and the current feature points are indicated by arrows, and a goal feature point for which a corresponding current feature point has not been detected from the candidate feature points is indicated by a solitary mark without an arrow. The goal feature point for which a corresponding current feature point has not been detected is excluded from the matching information.

Figure 13D:
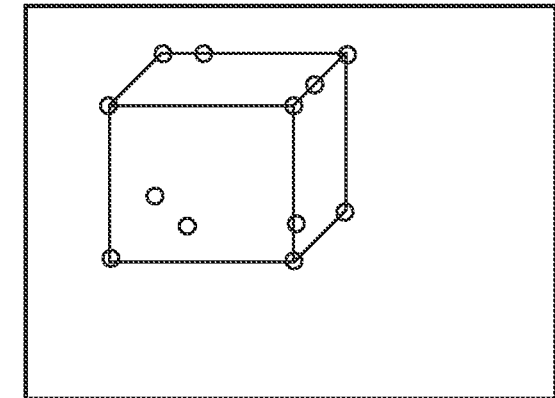
FIG. 13D illustrates an example in which current feature points extracted from the candidate feature points in the second embodiment are superimposed on the current image.

FIG. 13D schematically illustrates ones of the candidate feature points successfully matched with the goal feature points, that is, current feature points, in the state of being superimposed on the current image. The image exemplified in FIG. 13C or 13D can be displayed on the display screen of the output device 103. As in the example illustrated in FIG. 13C, if arrows or the like indicating the association between the current feature points and the goal feature points are displayed together, the user can easily recognize whether or not the matching of the feature points is properly performed. In addition, displaying, in an identifiable manner, the goal feature points for which corresponding current feature points have not been detected in the candidate feature points is also a preferable display method.

In the present embodiment, after the current feature points are extracted in step S23, processing of estimating (calculating) the cluster representative information for the current feature points is performed in step S104.

Figure 13E:
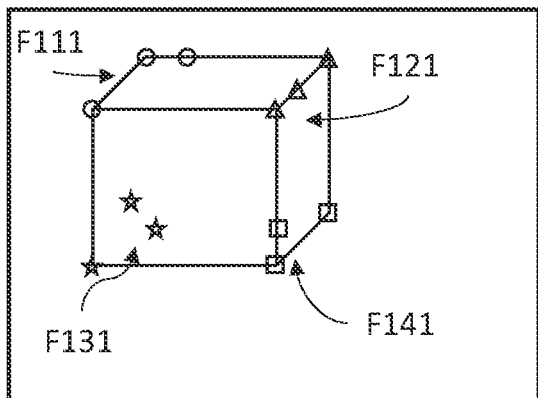
FIG. 13E illustrates an example in which a result of clustering of the current feature points is superimposed on the current image in the second embodiment.

In step S104, first, as second clustering processing, the current feature points are divided (classified) into a plurality of current feature point clusters. FIG. 13E illustrates the result of the division (classification) of the current feature points into a plurality of current feature point clusters, in the state of being superimposed on the current image. The feature point clustering portion 109 divides (classifies) the current feature points illustrated in FIG. 13D into a plurality of clusters in correspondence with the cluster division (classification) of the goal feature points illustrated in FIG. 12D. That is, in the case where a current feature point is associated with a goal feature point belonging to a goal feature point cluster F110 in the matching, the current feature point is classified into a current feature point cluster F111 corresponding to the goal feature point cluster F110. Similarly, in the case where a current feature point is associated with a goal feature point belonging to a goal feature point cluster F120, F130, or F140 in the matching, the current feature point is classified into a current feature point cluster F121, F131, or F141, respectively. The goal feature point clusters respectively correspond to the current feature point clusters in this order.

If each current feature point cluster includes three or more current feature points, affine transformation between the goal feature points and the current feature points can be calculated. In addition, although there is a possibility that an erroneous candidate feature point is extracted as a current feature point as a result of erroneous matching, if there are three or more feature points that are accurately detected in the cluster, the erroneous current feature point can be removed for appropriate affine transformation by using a robust estimation method such as random sample consensus: RANSAC. As described above, the number N of the goal feature points extracted from the goal image preferably satisfies $N \geq 3 \times L$ where L represents the minimum integer M satisfying $M > (n+1)/\psi$.

To be noted, the feature point clustering portion 109 may perform the clustering of the current feature points on the basis of a distance in the current image. Alternatively, the clustering of the current feature points may be performed on the basis of the luminance value (gradation level) in the current image. Alternatively, the clustering may be performed such that the current feature points on the same surface are included in the same current feature point cluster on the basis of the shape model of the workpiece 4. In addition, in the case where the current image includes the robot together with the workpiece such as a case where the image pickup apparatus is disposed not in the robot, the clustering may be performed on the basis of the shape model of the workpiece and the shape model of the robot.

Next, the feature point clustering portion 109 calculates the current feature point cluster representative information for each of the current feature point clusters. The current feature point cluster representative information is information indicating the current feature point cluster as one image feature, and is used later for feedback control. Processing similar to the processing of obtaining the goal feature point cluster representative information in step S92 is performed, and thus the current feature point cluster representative information based on the current image is obtained. As a matter of course, a calculation method different from step S92 may be used for calculating the current feature point cluster representative information. One of the current feature points included in a certain current feature point cluster may be also used as the current feature point cluster representative information of the certain current feature point cluster.

Figure 13F:
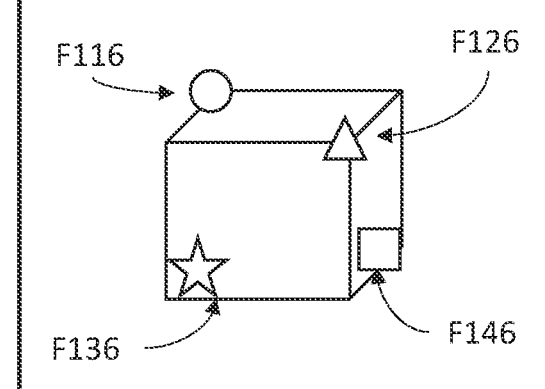
FIG. 13F illustrates an example in which current feature point cluster representative information calculated in the second embodiment is superimposed on the current image.

FIG. 13F schematically illustrates the obtained current feature point cluster representative information superimposed on the current image. As can be seen from comparison with FIG. 13E, current feature point cluster representative information F116 is calculated for the current feature point cluster F111, and current feature point cluster representative information F126 is calculated for the current feature point cluster F121. Similarly, current feature point cluster representative information F136 is calculated for the current feature point cluster F131, and current feature point cluster representative information F146 is calculated for the current feature point cluster F141.

To be noted, when executing the processing of step S104 an image exemplified in FIG. 13E or 13F can be displayed on the display screen of the output device 103. The obtained current feature point cluster representative information is stored in the storage device 104 or the main storage device (RAM) to be used in the feedback control.

Figure 14:
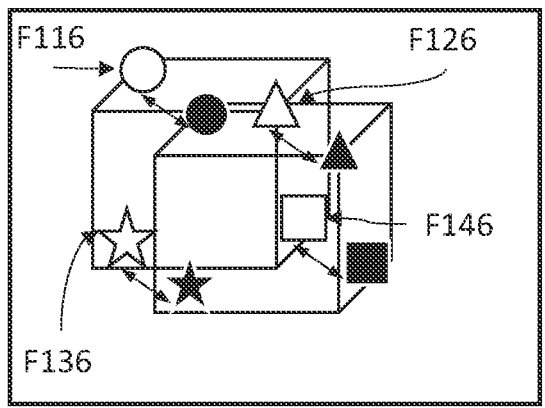
FIG. 14 is a schematic diagram illustrating matching processing between the goal feature point cluster representative information and the current feature point cluster representative information in the second embodiment.

Next, in step S24, an image Jacobian is generated. Description of the image Jacobian is basically the same as the description in the first embodiment, and will be therefore omitted. In the present embodiment, the goal feature point cluster representative information and the current feature point cluster representative information are used as the matching information as schematically illustrated in FIG. 14.

Next, in step S25, the feedback amount for the robot 1 is calculated by using the matching information and the image Jacobian generated in step S24. Description of the method for calculating the feedback amount is basically the same as the description in the first embodiment, and will be therefore omitted.

Description of steps S26 to S29 is basically the same as the matter described in the first embodiment by using the same reference signs, and will be therefore omitted.

According to the processing described above, even in the case where corresponding current feature points are not detected for some goal feature points, the current feature point cluster representative information can be estimated and the visual servo control can be appropriately performed if current feature points of a certain number or more are detected in each current feature point cluster.

To be noted, the formula (5) described above can be modified to stricter conditions in accordance with the estimation method for the current feature point cluster representative information in step S104. For example, the formula (5) may be expanded to the formula (6).

$$n + 1 \leq \phi k \leq \frac{\psi N}{m} \tag{6}$$

Here, m is a natural number of 2 or more. In the case where the formula (6) is satisfied, the cluster division can be performed such that each cluster includes m or more feature points, and therefore the estimation of the cluster representative information can be performed with higher precision by appropriately selecting m. For example, if m is set to 3, each cluster includes 3 or more feature points, and therefore the affine transformation between the current feature points and the goal feature points can be calculated. By performing the calculated affine transformation of the cluster representative information of the goal image, the current value (current feature point cluster representative information) of the cluster representative information can be estimated while suppressing the influence of the variation of the center of gravity of the cluster derived from the detection state of the feature points.

Further, if m is set to 4 or more, the estimation of the cluster representative information can be performed for all the clusters even if some of the feature points are not detected. In addition, estimation of the cluster representative information can be performed robustly by using a method such as RANSAC or least median of squares: LMedS, and thus not only non-detection but also erroneous detection of the feature points can be addressed.

Figure 11B:
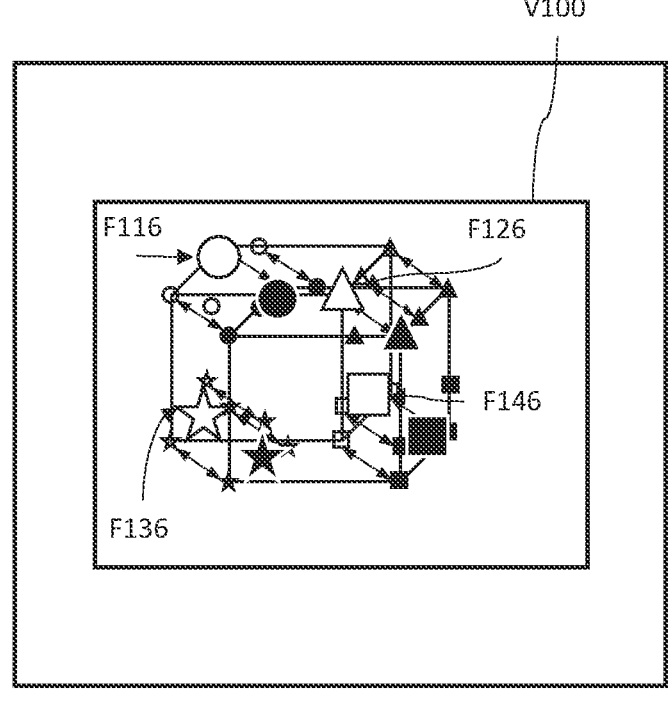
FIG. 11B illustrates an example of a display screen in the case of displaying a matching result on an output device.

The matching result may be displayed on the output device 103 if necessary. FIG. 11B illustrates an example of a display screen in the case of displaying the matching result on the output device 103. By displaying the current feature point cluster representative information F116, F126, F136, and F146 in the state of being superimposed on the current image in the image data display portion V100, the user can check whether or not the estimation of the current feature point cluster representative information is properly performed. Displaying the goal feature point cluster representative information F115, F125, F135, and F145 in the state of being superimposed on the goal image is also a preferably display method.

Further, additionally displaying lines indicating the correspondence relationship between the current feature point cluster representative information and the goal feature point cluster representative information is also a preferable display method. Further, the goal feature point clusters F110, F120, F130, and F140 and the current feature point clusters F111, F121, F131, and F141 may be displayed, and results of RANSAC, LMedS, or the like may be displayed. As a result of this, the user can check the processing results more in detail. The goal feature points and the cluster representative information described above may be displayed as different figures or in different colors such that which feature point belongs to which cluster is understandable.

Merits of Second Embodiment

In the control method according to the first embodiment, the goal feature points more than the minimum feature point number L are extracted so as to secure redundancy. Therefore, the visual servo control can be executed with higher reliability than related art even in the case where there is a goal feature point F102 for which no corresponding current feature point is detected. However, for example, in the case where the imaging conditions such as external light at the time of capturing the current image easily change, the matching is not necessarily always successful for the same goal feature point as illustrated in FIG. 6D. That is, there is a possibility that the goal feature points used for calculating the control amount of the visual servo control change (swap) each time the current image is captured. Typically, since the tendency of occurrence of an error in the processing of detecting the feature point differs for each feature point, there is a possibility that the detected feature points change each time a control loop is executed in the visual servo control in the first embodiment. If the goal feature points used for the control are not constant between control timings, the error in the feedback signal changes every time, and it may be difficult to quickly and smoothly control the robot. For example, there is a possibility that it takes a long time for the control result to settle, or that the control precision changes over time.

In the second embodiment, similarly to the first embodiment, the goal feature points more than the minimum feature point number L are extracted so as to secure redundancy. Therefore, information required for appropriately executing the visual servo can be stably obtained from the captured images, and thus the visual servo processing can be executed with higher reliability than the related art. Further, in the second embodiment, the goal feature points are subjected to clustering processing, goal feature point cluster representative information is obtained for each cluster, the current feature points are also subjected to clustering processing, and current feature point cluster representative information is obtained. Further, the feedback amount is calculated by using the goal feature point cluster representative information extracted from the goal image and the current feature point cluster representative information extracted from the current image, and thus the visual servo control is executed. For example, even in the case where the imaging conditions change and the goal feature points for which matching is successful change (swap) each time the current image is captured, the cluster representative information is less likely to be influenced by that, and thus feedback control can be performed more stably than in the first embodiment.

In the present embodiment, since feature point cluster representative information estimated from a plurality of feature points included in a cluster is used for calculating the feedback amount, the tendency of occurrence of an error in the feedback signal changing each time the control loop is performed is less likely to occur. Therefore, the present embodiment has a merit that it is easier to control the robot quickly and smoothly than in the first embodiment.

Third Embodiment

Figure 15:
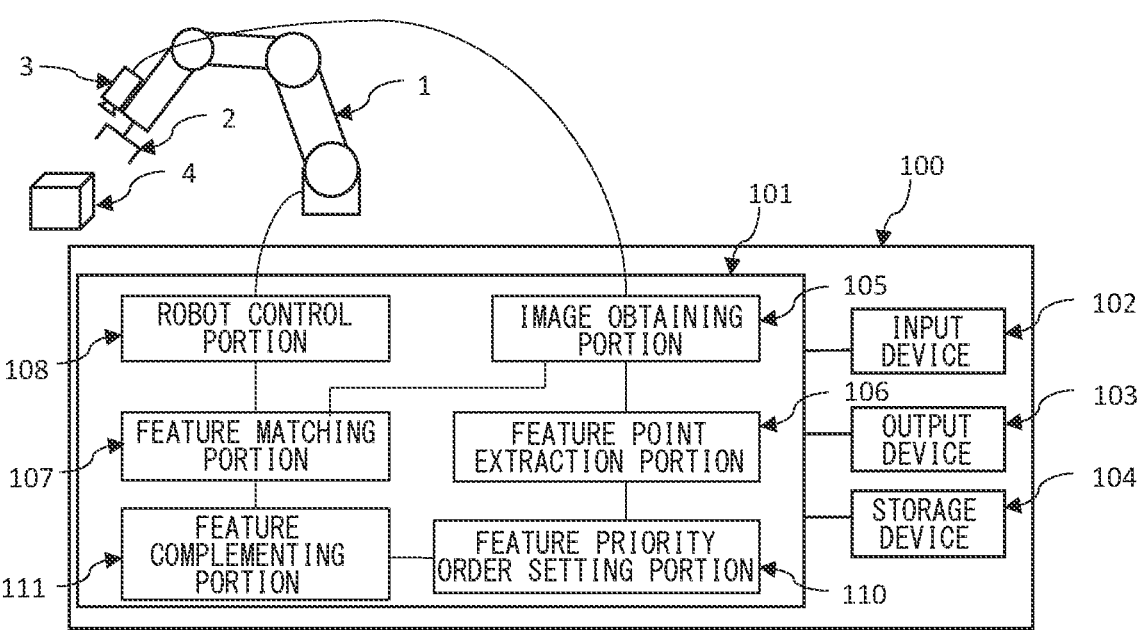
FIG. 15 is a schematic view of a robot system according to a third embodiment illustrating a schematic configuration thereof.

FIG. 15 is a schematic diagram illustrating a schematic configuration of a robot system that is a system according to a third embodiment. The robot system includes the robot 1 and the controller 100 serving as a control portion. Description of elements and processing common to the first embodiment will be simplified or omitted.

The robot 1 is, for example, a multi-axis controllable articulated robot, but the robot 1 may be a robot of a different type or a movable apparatus. For example, the robot 1 may be an apparatus including a movable portion capable of performing expansion/contraction, bending, vertical movement, horizontal movement, turning, or a composite operation of these.

In the present embodiment, the control apparatus 101 includes a feature priority order setting portion 110 and a feature complementing portion 111 in addition to the image obtaining portion 105, the feature point extraction portion 106, the feature matching portion 107, and the robot control portion 108. The feature priority order setting portion 110 has a function of setting a priority order for the goal feature points extracted by the feature point extraction portion 106, and the feature complementing portion 111 has a function of generating complemented current feature points by deleting and adding current feature points on the basis of the matching information generated by the feature matching portion 107 and the priority order set by the feature priority order setting portion 110.

To be noted, "complementing" mentioned herein means to correct the extracted current feature points, and examples thereof include not only supplementing shortage of current feature points but also deleting a current feature point having a low priority and replacing a certain current feature point by another current feature point. Therefore, the "complementary processing" may be also referred to as correction processing.

Figure 16:
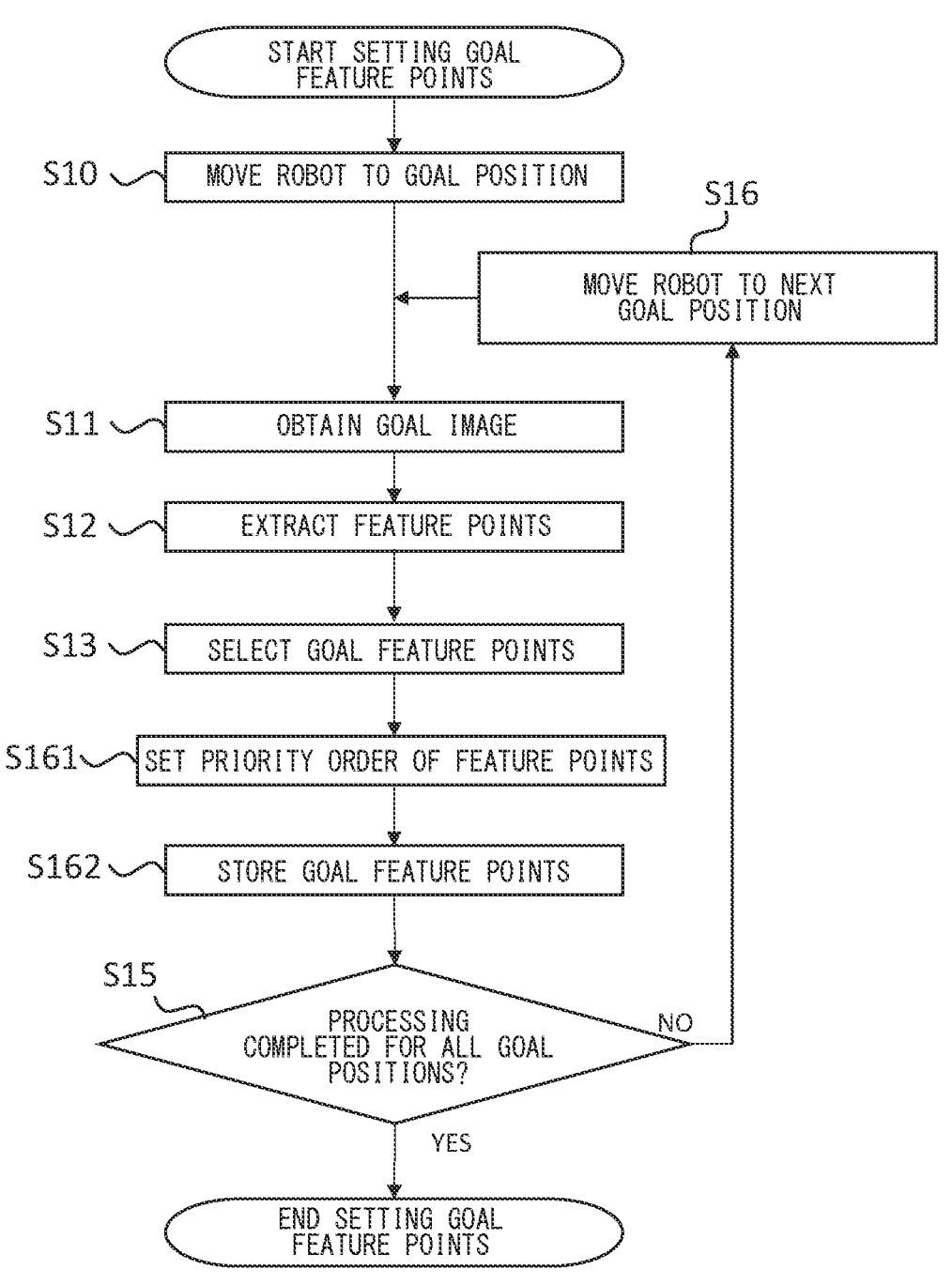
FIG. 16 is a flowchart illustrating a flow of processing of setting goal feature points in the third embodiment.
Figure 17:
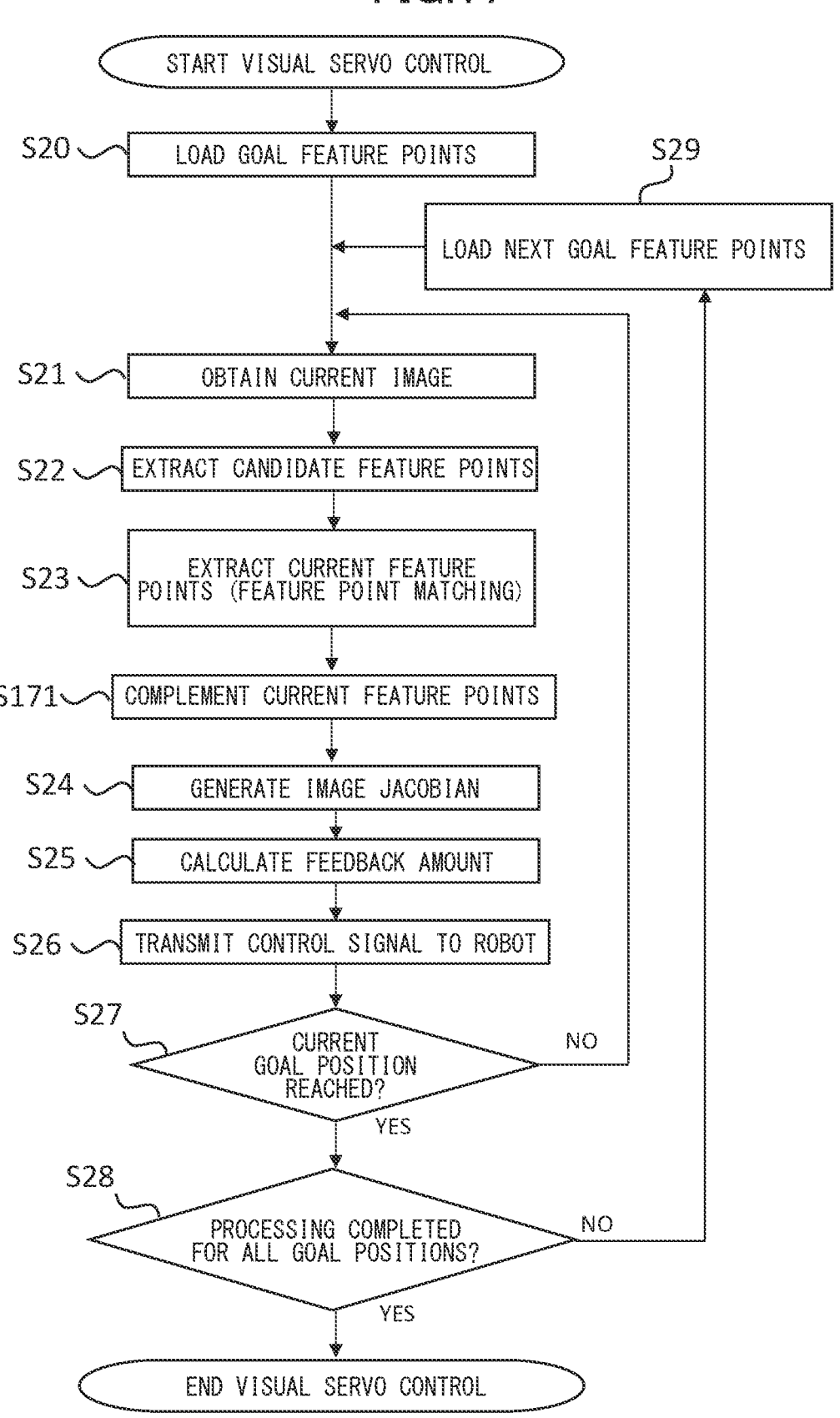
FIG. 17 is a flowchart illustrating a flow of processing of controlling the operation of a robot by visual servo control using information of the goal feature points in the third embodiment.
Figure 19A:
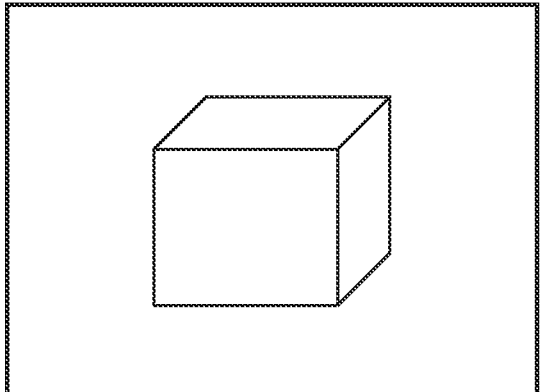
FIG. 19A illustrates an example of a goal image obtained in the third embodiment.
Figure 19B:
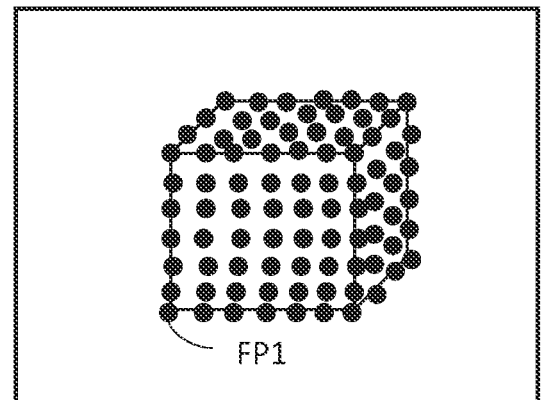
FIG. 19B illustrates an example in which feature points extracted from the goal image in the third embodiment are superimposed on the goal image.
Figure 19C:
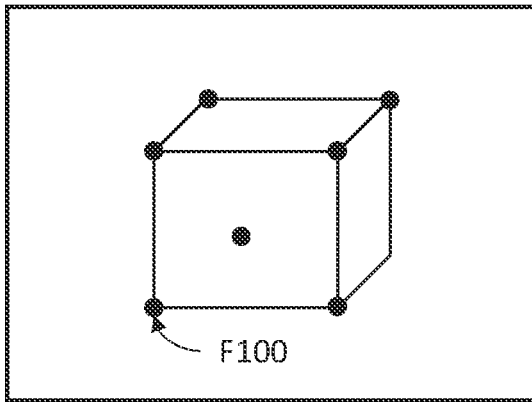
FIG. 19C illustrates an example in which goal feature points extracted in the third embodiment are superimposed on the goal image.

Visual servo control in the robot system according to the present embodiment will be described. FIG. 16 is a flowchart illustrating a flow of processing of, as preparation for the visual servo control, moving the robot 1 to the goal position and causing the image pickup apparatus 3 to perform imaging in advance, extracting the goal feature points on the basis of the obtained image, and setting the priority order. In addition, FIG. 17 is a flowchart illustrating the flow of processing of controlling the operation of the robot 1 by visual servo control. This will be sequentially described below.
Preparation for Visual Servo Control In FIG. 16, processing of steps S10, S11, S12, S13, S15, and S16 is the same as the processing described by using the same reference signs in the first embodiment. FIG. 19A illustrates an example of a goal image obtained in step S11. FIG. 19B schematically illustrates feature points FP1 extracted in step S12, in the state of being superimposed on the goal image. FIG. 19C schematically illustrates the goal feature points F100 extracted in step S13, in the state of being superimposed on the goal image.

In step S161, the feature priority order setting portion 110 performs feature priority order setting processing. That is, the priority order for use in the feedback processing is set for the N goal feature points extracted in step S13. The priority order may be manually set by the user, or may be automatically determined in accordance with an evaluation value of each feature point.

Here, the evaluation value of each feature point is a numerical representation of whether or not the performance or reliability of the system improves when the feature point is used for generating the feedback signal, and known methods can be freely used for calculating the evaluation value. For example, each feature point may be weighted in accordance with the number of times the feature point is detected (detection frequency) by repeatedly performing steps S11 to S13 a plurality of times, and the result of the weighting may be employed as the evaluation value. Similarly, a detection precision at the time of extracting the same feature point a plurality of times, that is, the standard deviation of the coordinates may be used. When performing steps S11 to S13 a plurality of times, the image pickup apparatus 3 may be disposed at a plurality of different positions, and an image group captured from the plurality of positions may be obtained. In this case, for the evaluation of the detection precision, for example, the difference between the estimated position of each feature point calculated by using an image Jacobian or the like and the actually extracted position may be used.

Alternatively, the contribution of each feature point to the visual servo control performance may be used as the evaluation value. For example, in the case where the minimum integer M satisfying $M > (n+1)/\psi$ is denoted by L, L goal feature points among the N goal feature points can be selected, and the sensitivity at the time of calculating the image Jacobian by using only the selected goal feature points, that is, the minimum singular value of the image Jacobian can be calculated. The sensitivity can be calculated for all the combinations of the L goal feature points, and for each feature point, the sum of the sensitivities of the combinations including the feature point can be calculated as the evaluation value.

Figure 19D:
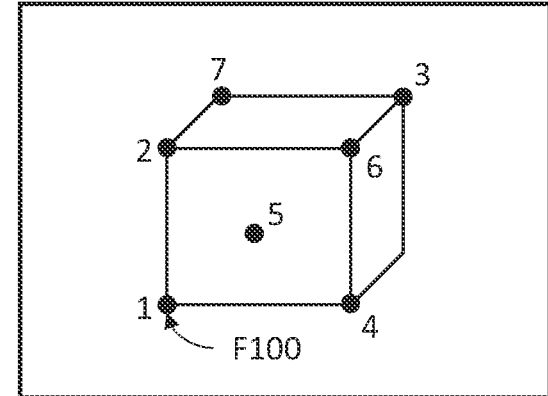
FIG. 19D illustrates an example in which the goal feature points and a priority order are superimposed on the goal image in the third embodiment.

FIG. 19D schematically illustrates the priority order set for the goal feature points in step S161, in the state of being superimposed on the goal image. In the illustrated example, an order from 1 to 7 is set for seven goal feature points F100. The smaller number corresponds to higher placement in the priority order.

Next, in step S162, the goal feature points and the priority order are stored in the storage device 104 or the main storage device (RAM) so as to be referred to in the later stage of processing.

Figure 18A:
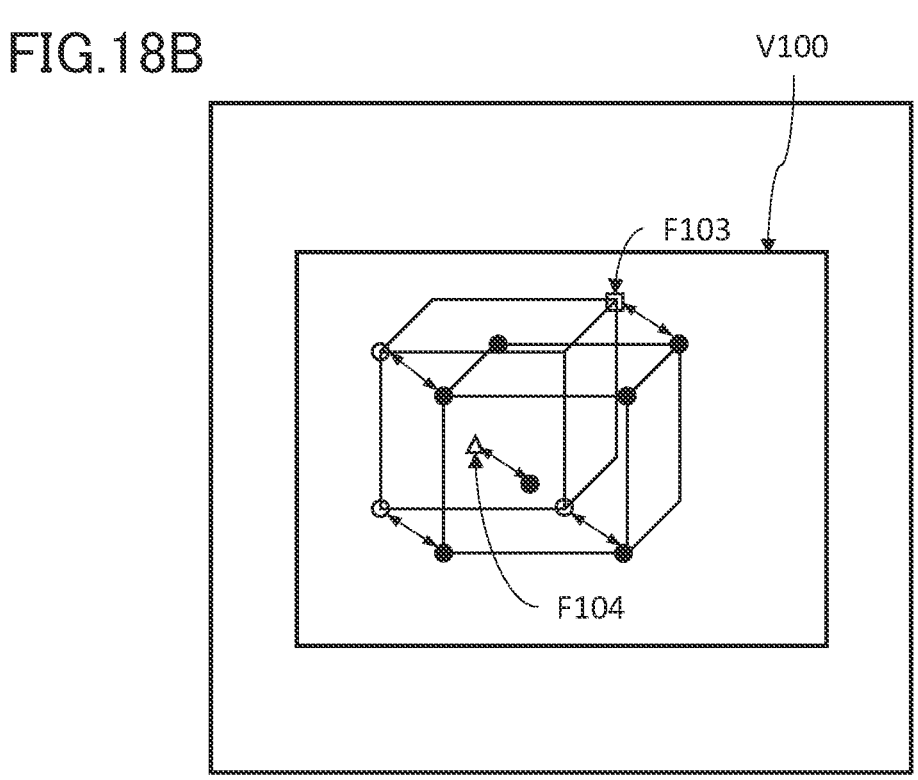
FIG. 18A is a diagram illustrating an example of a user interface screen that can be displayed in the third embodiment.

FIG. 18A illustrates an example of a display screen displayed on the output device 103 in steps S11, S12, S13, S161, and S162 of the present embodiment. The display screen may include the image data display portion V100, the image pickup button V101, and the registration button V102.

The user can operate the image pickup button V101 and the registration button V102 by using the input device 102. By turning on the image pickup button V101, the processing from step S11 to step S161 is started. In step S11, the image data display portion V100 displays, for example, the goal image illustrated in FIG. 19A, and in step S12, the image data display portion V100 displays, for example, the candidate feature points illustrated in FIG. 19B. In step S13, the image data display portion V100 displays the goal feature points illustrated in FIG. 19C. In addition, in step S161, for example, the result of setting of the priority order of the feature points is displayed as illustrated in FIG. 19D. In the case of manually setting the priority order, for example, a function of setting the priority order by the user designating goal feature points and the priority order in the image data display portion V100 by using the input device 102 may be provided.

In each display screen, the goal feature points and the priority order may be displayed such that the placement in the priority order is displayed in the vicinity of each goal feature point, or may be displayed in different colors. The user may select the registration button V102 to record the processing result as the goal image and the goal feature points and proceed to the next step, or in the case where there is a problem in the processing result, select the image pickup button V101 again to execute the processing of step S11 and later steps again.

To be noted, all the display examples described above may or may not be executed, and the design of the screen may be appropriately modified. For example, the functions of the image pickup button V101 and the registration button V102 may be divided into a larger number of buttons, or may be realized by inputting a command.

Visual Servo Control

Figure 20A:
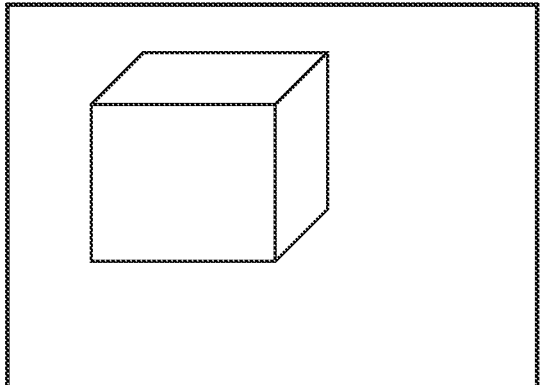
FIG. 20A illustrates an example of a current image obtained in the third embodiment.
Figure 20B:
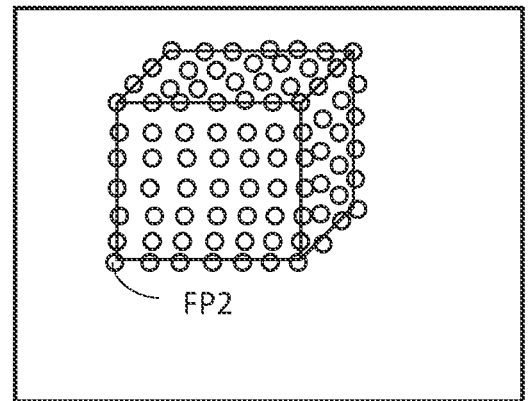
FIG. 20B illustrates an example in which candidate feature points extracted in the third embodiment are superimposed on the current image.
Figure 20C:
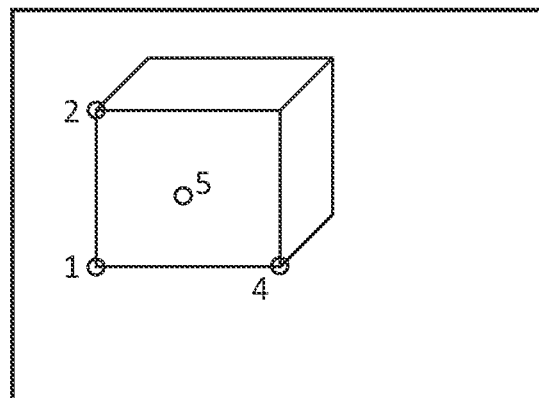
FIG. 20C illustrates an example in which current feature points extracted from the candidate feature points in the third embodiment are superimposed on the current image.

A procedure of causing the robot 1 to perform the work operations by using the visual servo control in the present embodiment will be described with reference to FIG. 17. The processing of each of steps S20 to S23 illustrated in FIG. 17 is the same as the processing described by using the same reference signs in FIG. 3 of the first embodiment. FIG. 20A illustrates an example of the current image obtained in step S21, and FIG. 20B illustrates an example in which the candidate feature points FP2 extracted in step S22 are superimposed on the current image. FIG. 20C illustrates candidate feature points successfully associated with the goal feature points in step S23, that is, the current feature points, in the state of being superimposed on the current image. The image exemplified in FIG. 20A, 20B, or 20C can be displayed on the display screen of the output device 103.

In the present embodiment, after the current feature points are extracted in step S23, processing of deleting and adding current feature points to generate complemented current feature points is performed in step S171. In step S171, first, the priority order of the goal feature points to be associated with the current feature points is checked. In the description below, a current feature point corresponding to a goal feature point in the M-th place in the priority order will be referred to as a current feature point in the M-th place in the priority order. In the case where all the current feature points in the 1st to L-th places in the priority order are detected for the minimum feature point number L, the complementary current feature points are obtained by deleting the current feature points placed lower than the L-th place in the priority order (current feature points whose number in the priority order is larger than L) among all the current feature points. That is, the number of the complemented current feature points is equal to the minimum feature point number L.

Meanwhile, in the case where any of the current feature points in the 1st to L-th places in the priority order is not detected, the current feature points are complemented by using other information, and thus the complemented current feature points are generated. As the method for complementing the current feature points, a method of using a current feature point placed lower than the L-th place in the priority order is the simplest. For example, it is assumed that L is 4 and the current feature points in the 1st, 2nd, 4th, 5th, and 6th places in the priority order are detected. Since the current feature point in the 3rd place in the priority order is not detected, the complemented current feature points of the number equal to the minimum feature point number L can be generated by employing the current feature point in the 5th place in the priority order and deleting the current feature point in the 6th place in the priority order.

In addition, as a method for complementing the current feature points, the undetected current feature point may be estimated and the estimated value may be used in place of the current feature point. As the method for estimating the undetected current feature point, a known method can be freely used, and preferably, coordinate transformation (geometrical transformation) such as affine transformation or homography transformation may be used, or the history of the past motion of the current feature points may be used. For example, it is assumed that L is 4 and the current feature points in the 1st, 2nd, 4th, 5th, and 6th places in the priority order are detected. In this case, homography transformation between the current feature points in the 1st, 2nd, 4th, and 5th places in the priority order and corresponding goal feature points can be obtained. The position of the current feature point placed 3rd in the priority order can be estimated by performing the same transformation on the goal feature point placed 3rd in the priority order.

Alternatively, if the position of each current feature point, the amount of movement of the image pickup apparatus 3, and a physical model associating these with each other are stored in the main storage device (RAM) or the like each time steps S23 and S25 are performed, the current feature point placed 3rd in the priority order can be estimated by using a Bayesian filter such as a Kalman filter. The complemented current feature points of the number equal to the minimum feature point number L can be generated by adding the current feature point in the 3rd place in the priority order obtained by these methods and deleting the current feature points in the 5th and 6th places in the priority order.

As the method for generating the complemented current feature points (method for correcting the extracted current feature points), a plurality of methods described above may be combined, and for example, in the case where the reliability of the current feature point placed 3rd in the priority order estimated by using a Kalman filter is low, the current feature point placed 5th in the priority order may be kept instead of adding the estimated value of the current feature point placed 3rd in the priority order.

Figure 20D:
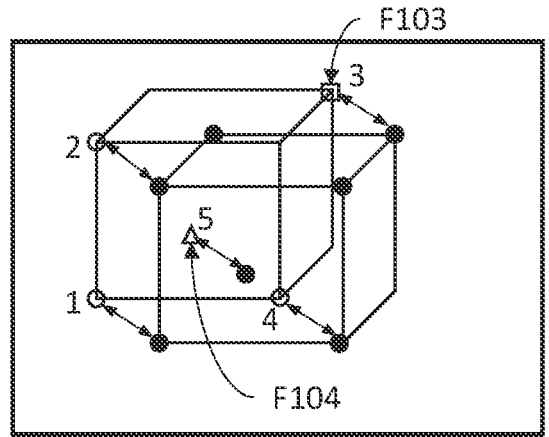
FIG. 20D illustrates an example of a result of deletion and addition by complementary processing on the current feature points in the third embodiment.

FIG. 20D schematically illustrates the processing result of step S171, that is, the complemented current feature points and the deleted current feature points, in the state of being superimposed on the current image. The image exemplified in FIG. 20D can be displayed on the display screen of the output device 103. As in the example illustrated in FIG. 20D, indicating an added estimated value F103 of the current feature point and a deleted current feature point F104 by different signs or colors so as to be distinguishable from the detected current feature points is also a preferable display method.

In step S24, the image Jacobian is generated. Description of the image Jacobian is basically the same as description in the first embodiment, and will be therefore omitted. In the present embodiment, the image Jacobian is generated by using matching information between the complemented current feature points and the goal feature points.

Next, in step S25, the feedback amount for the robot 1 is calculated by using the matching information between the complemented current feature points and the goal feature points and the image Jacobian generated in step S24. Description of the method for calculating the feedback amount is basically the same as the description in the first embodiment, and will be therefore omitted. Description of steps S26 to S29 is basically the same as the matter described in the first embodiment (FIG. 3) by using the same reference signs, and will be therefore omitted.

To be noted, the goal feature point cluster representative information and the current feature point cluster representative information may be used instead of the goal feature points and the current feature points described above similarly to the second embodiment. As a first method, the current feature points complemented (corrected) on the basis of the priority order as described above and the goal feature points may be classified into the goal feature point cluster representative information and the current feature point cluster representative information similarly to the second embodiment, and the image Jacobian may be generated in step S24. As a second method, the goal feature points may be classified into goal feature point clusters of a number larger than the minimum required cluster number, and the priority order may be set for the goal feature point clusters. In the case where the current feature points cannot be classified into a current feature point cluster corresponding to a goal feature point cluster placed high in the priority order or the case where it is evaluated that the classification is possible but there is a problem in the classification, a current feature point cluster corresponding to a goal feature point cluster placed lower in the priority order can be employed instead. That is, part of the current feature point cluster representative information corresponding to the goal feature point cluster representative information placed higher in the priority order can be complemented (corrected) by using current feature point cluster representative information corresponding to the goal feature point cluster representative information placed lower in the priority order. A required number of pieces of current feature point cluster representative information complemented or corrected in this manner are extracted in the order of higher to lower in the priority order, and the image Jacobian is generated in step S24. Then, in step S25, the feedback amount for the robot 1 can be calculated by using the matching information between the goal feature point cluster representative information and the current feature point cluster representative information and the image Jacobian generated in step S24. To be noted, description of the image Jacobian and description of steps S26 to S29 are basically the same as the description in the first embodiment, and will be therefore omitted.

Merits of Third Embodiment

In the control method according to the first embodiment, the goal feature points more than the minimum feature point number L are extracted so as to secure redundancy. Therefore, the visual servo control can be executed with higher reliability than related art even in the case where there is a goal feature point F102 for which no corresponding current feature point is detected. However, for example, in the case where the imaging conditions such as external light at the time of capturing the current image easily change, the matching is not necessarily always successful for the same goal feature point as illustrated in FIG. 6D. That is, there is a possibility that the goal feature points used for calculating the control amount of the visual servo control change (swap) each time the current image is captured. Typically, since the tendency of occurrence of an error in the processing of detecting the feature point differs for each feature point, there is a possibility that the detected feature points change each time a control loop is executed in the visual servo control in the first embodiment. If the goal feature points used for the control are not constant between control timings, the error in the feedback signal changes every time, and it may be difficult to quickly and smoothly control the robot.

For example, there is a possibility that it takes a long time for the control result to settle, or that the control precision changes over time.

In the third embodiment, similarly to the first embodiment, the goal feature points more than the minimum feature point number L are extracted so as to secure redundancy. Therefore, information required for appropriately executing the visual servo can be stably obtained from the captured images, and thus the visual servo processing can be executed with higher reliability than in the related art. Further, in the third embodiment, a priority order is set for the goal feature points, and the complemented current feature points of the number equal to the minimum feature point number L are generated. Then, the image Jacobian is generated by using the complemented current feature points, the feedback amount is calculated by using the matching information between the complemented current feature points and the goal feature points, and thus the visual servo control is performed. For example, even in the case where the imaging conditions change and the goal feature points for which matching is successful change (swap) each time the current image is captured, the complemented current feature points are less likely to be influenced by that, and thus feedback control can be performed more stably than in the first embodiment.

In the present embodiment, since feature points that improve the visual servo control performance or that have high detection performance are used with higher priority for calculating the feedback amount, the tendency of occurrence of an error in the feedback signal changing each time the control loop is performed is less likely to occur. Therefore, the present embodiment has a merit that it is easier to control the robot quickly and smoothly than in the first embodiment.

Modifications of Embodiments

To be noted, the present invention is not limited to the embodiments and examples described above, and can be modified in many ways within the technical concept of the present invention. For example, different embodiments described above may be implemented in combination. A control program that causes a computer to execute the control method described above and a non-transitory computer-readable recording medium storing the control program are also embodiments of the present invention.

The control method and the system of the present invention are applicable to control of various machines and equipment such as industrial robots, service robots, and machines that operate under numerical control by a computer, in addition to the manufacturing apparatuses including a movable portion.

The present invention can be also realized by processing performed by supplying a program that realizes one or more functions of the embodiments to a system or an apparatus via a network or a recording medium and one or more processors in a computer of the system or the apparatus loading and executing the program. In addition, the present invention can be also realized by a circuit (for example, ASIC) that realizes one or more functions. Various information described as being calculated or extracted in the embodiments described above can be also obtained by a method that is not calculation or extraction. For example, the method is not limited to acquisition by calculation, and the information can be obtained by replacing complicated calculation processing by reference processing to a simple matrix (lookup table (LUT)), or the information can be obtained by using machine learning.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions front the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-92208, filed Jun. 7, 2022, and Japanese Patent Application No. 2023-36711, filed Mar. 9, 2023, which are hereby incorporated by reference herein in their entirety.

What is claimed is:

1. A control method for controlling an apparatus including a movable portion by a visual servo, the control method comprising:

obtaining a goal image corresponding to a goal positional relationship between the movable portion and a target object;

extracting goal feature points from the goal image by image processing;

obtaining a current image corresponding to a current positional relationship between the movable portion and the target object;

extracting candidate feature points from the current image by image processing;

extracting current feature points associated with the goal feature points from the candidate feature points by performing matching processing between the candidate feature points and the goal feature points;

correcting the current feature points by using the current feature points obtained by the matching processing and a priority order set for the goal feature points; and generating, by using matching information based on matching between the corrected current feature points and the goal feature points, a control signal for moving the movable portion.

2. The control method according to claim 1, further comprising:

classifying the goal feature points into a plurality of goal feature point clusters by first clustering processing;

obtaining goal feature point cluster representative information for each of the plurality of goal feature point clusters;

classifying the current feature points into a plurality of current feature point clusters by second clustering processing; and obtaining current feature point cluster representative information for each of the plurality of current feature point clusters, wherein the matching information includes the current feature point cluster representative information and the goal feature point cluster representative information.

3. The control method according to claim 2, wherein a priority order is set for the goal feature point clusters into which the goal feature points have been classified, and wherein, in the matching processing, a current feature point cluster associated with a goal feature point cluster placed higher in the priority order is obtained with a higher priority.

4. The control method according to claim 2, wherein the goal feature points include a first goal feature point, the current feature points include a first current feature point associated with the first goal feature point in the matching processing, the goal feature point clusters include a first goal feature point cluster including the first goal feature point, and the current feature point clusters include a first current feature point cluster corresponding to the first goal feature point cluster, and wherein, in the second clustering processing, the first current feature point is classified into the first current feature point cluster.

5. The control method according to claim 2, wherein the first clustering processing and/or the second clustering processing corresponds to at least one of first processing, second processing, or third processing below, wherein, in the first processing:

the goal feature points are classified into the plurality of goal feature point clusters in the first clustering processing on a basis of a distance in the goal image, and/or the current feature points are classified into the plurality of current feature point clusters in the second clustering processing on a basis of a distance in the current image, wherein, in the second processing:

the goal feature points are classified into the plurality of goal feature point clusters in the first clustering processing on a basis of a gradation level in the goal image, and/or the current feature points are classified into the plurality of current feature point clusters in the second clustering processing on a basis of a gradation level in the current image, and wherein, in the third processing:

the goal feature points are classified into the plurality of goal feature point clusters in the first clustering processing on a basis of a shape model of the target object and/or a shape model of the movable portion, and/or the current feature points are classified into the plurality of current feature point clusters in the second clustering processing on a basis of the shape model of the target object and/or the shape model of the movable portion.

6. The control method according to claim 2, wherein a position of a center of gravity of the goal feature points included in each of the plurality of goal feature point clusters is obtained as the goal feature point cluster representative information, and wherein a position of a center of gravity of the current feature points included in each of the plurality of current feature point clusters is obtained as the current feature point cluster representative information.

7. The control method according to claim 2, wherein a position of a center of gravity of the goal feature points included in each of the plurality of goal feature point clusters, and a magnification ratio and/or a rotation angle are obtained as the goal feature point cluster representative information, and wherein a position of a center of gravity of the current feature points included in each of the plurality of current feature point clusters, and the magnification ratio and/or the rotation angle are obtained as the current feature point cluster representative information.

8. The control method according to claim 1, wherein the priority order is set by using at least one of:

detection frequency of the goal feature points;

contribution of the goal feature points to visual servo control performance;

detection precision of the goal feature points; or a group of images captured from a plurality of positions.

9. The control method according to claim 1, wherein the corrected current feature points are generated by using at least one of:

one or more of the current feature points placed low in the priority order;

geometric transformation from one or more of the current feature points; and a physical model and a motion history.

10. The control method according to claim 1, wherein the image processing is processing utilizing an image feature value that is not changed by any of rotation, enlargement, and size reduction.

11. The control method according to claim 1, wherein the goal image and the current image are captured by an image pickup apparatus attached to the movable portion.

12. The control method according to claim 1, wherein the goal image and the current image are captured by an image pickup apparatus disposed at a position where the image pickup apparatus is capable of imaging the movable portion and the target object.

13. The control method according to claim 1, wherein the apparatus including the movable portion is a robot.

14. The control method according to claim 1, wherein an information of the extracting goal feature points has a degree of freedom of y, wherein in the generating, the control signal for moving the movable portion is generated at a degree of freedom of n, and wherein the number of N of the goal feature points extracted from the goal image satisfies $N \geq 1 + (n+1)/\psi$.

15. The control method according to claim 14, wherein the number N satisfies $N \geq 1 + (n+1)/\psi$.

16. The control method according to claim 14, wherein the number N satisfies $N \geq L+1$, where L represents a minimum integer M satisfying $M > (n+1)/\psi$.

17. The control method according to claim 14, wherein the number N satisfies $N \geq 2 \times L$, where L represents a minimum integer M satisfying $M > (n+1)/\psi$.

18. The control method according to claim 14, wherein the number N of the goal feature points extracted from the goal image satisfies $N \geq 3 \times L$, where L represents a minimum integer M satisfying $M > (n+1)/\psi$.

19. The control method according to claim 14, wherein the number N satisfies $N \leq L+40$.

20. The control method according to claim 14, wherein the number N satisfies $N \leq 10 \times L$.

21. The control method according to claim 14, wherein n is 6 or 7, and $\psi$ is 2 or 3.

22. A non-transitory computer-readable recording medium storing a control program for causing a control portion to execute the control method according to claim 1.

23. A method for manufacturing a product, the method comprising manufacturing the product by controlling the apparatus by the control method according to claim 1, wherein the apparatus is an apparatus used for manufacturing the product.

24. A system comprising:

an apparatus including a movable portion; and a control portion, wherein the control portion executes the control method according to claim 6.

25. The system according to claim 24, wherein the control portion is configured to:

classify the goal feature points into a plurality of goal feature point clusters by first clustering processing;

obtain goal feature point cluster representative information for each of the plurality of goal feature point clusters;

classify the current feature points into a plurality of current feature point clusters by second clustering processing; and obtain current feature point cluster representative information for each of the plurality of current feature point clusters, and wherein the matching information includes the current feature point cluster representative information and the goal feature point cluster representative information.

26. The system according to claim 25, wherein a priority order is set for the goal feature point clusters into which the goal feature points have been classified, and wherein in the matching processing, a current feature point cluster associated with a goal feature point cluster that is higher in the priority order is obtained with a higher priority.

27. The system according to claim 24, wherein a priority order is set for the extracted goal feature points, and wherein in the matching processing, a current feature point associated with a goal feature point placed higher in the priority order is extracted with a higher priority.

28. The system according to claim 24, wherein the apparatus including the movable portion is a robot.

29. The system according to claim 24, wherein the control portion is configured to display, on a display screen, part or all of an image captured by an image pickup apparatus, the goal image, the candidate feature points, the goal feature points, the current image, the current feature points, and the matching information.

30. The system according to claim 29, wherein the control portion is configured to display, on the display screen, an instruction input portion related to an operation of the image pickup apparatus, and/or an instruction input portion related to an operation of registering information in a storage portion.

31. The system according to claim 24, wherein the control portion is configured to display, on a display screen, part or all of an image captured by an image pickup apparatus, the goal image, the candidate feature points, the goal feature points, the current image, the current feature points, the matching information, the goal feature point clusters, the goal feature point cluster representative information, the current feature point clusters, and the current feature point cluster representative information.

\* \* \* \* \*